US012257207B2

(12) United States Patent
Elderstiern et al.

(10) Patent No.: US 12,257,207 B2
(45) Date of Patent: Mar. 25, 2025

(54) MEDICAL PRESSURE THERAPY DEVICE AND COMPONENTS THEREOF

(71) Applicant: Otivio AS, Oslo (NO)

(72) Inventors: Jonas Elderstiern, Oslo (NO); Hannes Ulvegard, Oslo (NO); Ronny Brakhya, Oslo (NO); Robert Axelsson, Oslo (NO); Juho Laasanen, Oslo (NO); Iacob Mathiesen, Oslo (NO); Arnar Kristjansson, Oslo (NO)

(73) Assignee: OTIVIO AS, Oslo (NO)

(*) Notice: Subject to any disclaimer, the term of this patent is extended or adjusted under 35 U.S.C. 154(b) by 561 days.

(21) Appl. No.: 17/193,834

(22) Filed: Mar. 5, 2021

(65) Prior Publication Data

US 2021/0186797 A1 Jun. 24, 2021

Related U.S. Application Data

(63) Continuation of application No. 16/148,556, filed on Oct. 1, 2018, now Pat. No. 10,940,075, and a (Continued)

(51) Int. Cl.

| | |
|---|---|
| ***A61H 9/00*** | (2006.01) |
| ***A61G 10/02*** | (2006.01) |
| ***A61H 1/00*** | (2006.01) |

(52) U.S. Cl.

CPC ........... *A61H 9/0007* (2013.01); *A61G 10/02* (2013.01); *A61H 1/00* (2013.01); *A61H 9/0078* (2013.01);

(Continued)

(58) Field of Classification Search

None

See application file for complete search history.

(56) References Cited

U.S. PATENT DOCUMENTS

| | | |
|---|---|---|
| 1,071,103 A | 8/1913 | Sims |
| 1,110,494 A | 9/1914 | Kellogg |

(Continued)

FOREIGN PATENT DOCUMENTS

| | | |
|---|---|---|
| CN | 301338691 S | 9/2010 |
| CN | 205903203 U | 1/2017 |

(Continued)

OTHER PUBLICATIONS

Indian Office Action from Corresponding Indian Application No. 202017016268, Apr. 13, 2022.

(Continued)

*Primary Examiner* — Carrie R Dorna

(74) *Attorney, Agent, or Firm* — Workman Nydegger

(57) ABSTRACT

A pressure therapy device includes a pressure chamber, an inflatable padding, a seal, and a positioning mechanism. The pressure chamber has an opening arranged for admitting the inflatable padding and a limb of a user. The inflatable padding is inflatable to enclose and fix the limb in position. The seal covers the opening, including the inflatable padding and the limb to seal the pressure chamber from ambient atmospheric pressure. A pump unit is provided to generate a non-atmospheric pressure within the pressure chamber and includes a first valve system and a piston with safety release features for preventing unsafe pressure levels.

20 Claims, 11 Drawing Sheets

Related U.S. Application Data continuation of application No. 16/148,538, filed on Oct. 1, 2018, now Pat. No. 11,110,021, and a continuation of application No. 16/148,566, filed on Oct. 1, 2018, now Pat. No. 11,259,985.

(60) Provisional application No. 62/565,534, filed on Sep. 29, 2017.

(52) U.S. Cl.
CPC ... *A61H 9/0092* (2013.01); *A61H 2201/0103* (2013.01); *A61H 2201/0107* (2013.01); *A61H 2201/0176* (2013.01); *A61H 2201/0192* (2013.01); *A61H 2201/1409* (2013.01); *A61H 2201/164* (2013.01); *A61H 2201/1642* (2013.01); *A61H 2201/165* (2013.01); *A61H 2201/169* (2013.01); *A61H 2201/50* (2013.01); *A61H 2201/5038* (2013.01); *A61H 2201/5058* (2013.01); *A61H 2201/5097* (2013.01); *A61H 2205/106* (2013.01); *A61H 2205/12* (2013.01)

(56) References Cited

U.S. PATENT DOCUMENTS 1,399,095 A 12/1921 Webb
2,113,253 A 4/1938 Gray
2,168,611 A 8/1939 Thompson
2,272,481 A 2/1942 Rinkes et al.
2,626,601 A 1/1953 Riley
2,684,631 A 7/1954 Anthony et al.
2,702,552 A 2/1955 Moodie
2,913,293 A 11/1959 Dibley et al.
3,094,983 A 6/1963 Macleod
3,217,707 A 11/1965 Werding
3,286,711 A 11/1966 Macleod
3,292,613 A 12/1966 Macleod
3,391,692 A 7/1968 Spielberg
3,403,673 A 10/1968 Macleod
3,465,748 A 9/1969 Kravchenko
3,565,065 A 2/1971 Biggs, Jr. et al.
3,654,919 A 4/1972 Birtwell
3,744,491 A 7/1973 Fischer
3,757,806 A 9/1973 Bhaskar et al.
3,859,989 A * 1/1975 Spielberg ............... A61H 9/005
601/11
3,878,839 A 4/1975 Norton et al.
3,896,794 A 7/1975 McGrath
3,977,396 A 8/1976 Cartier
4,003,371 A * 1/1977 Fischer ................ A61H 9/0071
604/23
4,054,129 A 10/1977 Byars et al.
4,075,935 A 2/1978 Panigati
4,149,529 A 4/1979 Copeland et al.
4,186,732 A 2/1980 Christoffel
4,269,175 A 5/1981 Dillion
4,343,302 A 8/1982 Dillon
4,376,437 A 3/1983 Sundheim et al.
4,418,690 A 12/1983 Mummert
4,421,109 A 12/1983 Thornton
4,648,392 A 3/1987 Cartier et al.
4,667,672 A 5/1987 Romanowski
4,945,901 A 8/1990 Burcke, Jr.
4,986,260 A 1/1991 Iams et al.
5,000,164 A 3/1991 Cooper
5,009,251 A 4/1991 Pike et al.
5,029,579 A 7/1991 Trammell
5,063,910 A 11/1991 Cartier
5,074,285 A 12/1991 Wright
5,192,198 A 3/1993 Gebauer et al.
5,241,958 A 9/1993 Noeldner
5,279,283 A 1/1994 Dillon
5,297,580 A 3/1994 Thurman
5,300,103 A 4/1994 Stempel et al.
5,358,467 A 10/1994 Milstein et al.
5,413,599 A 5/1995 Imachi et al.
5,425,742 A * 6/1995 Joy ........................ A61H 35/00
601/152
5,458,562 A 10/1995 Cooper
5,507,312 A 4/1996 Dillman
5,514,079 A 5/1996 Dillon
5,669,872 A * 9/1997 Fox ...................... A61H 9/0078
601/152
5,683,438 A 11/1997 Grahn
5,688,225 A 11/1997 Walker
5,697,920 A 12/1997 Gibbons
5,916,183 A 6/1999 Reid
6,027,464 A 2/2000 Dahlquist
6,129,688 A 10/2000 Arkans
6,149,674 A 11/2000 Borders
6,277,052 B1 8/2001 Howard
6,423,017 B2 7/2002 Brotz
6,565,593 B2 5/2003 Diana
6,656,208 B2 12/2003 Grahn et al.
6,974,442 B2 12/2005 Grahn et al.
7,160,316 B2 1/2007 Hamilton et al.
7,691,084 B2 4/2010 Knighton et al.
7,717,869 B2 5/2010 Eischen, Sr.
7,771,402 B2 8/2010 Marasco
7,833,179 B2 11/2010 Filtvedt et al.
7,833,180 B2 11/2010 Filtvedt et al.
7,896,823 B2 3/2011 Mangrum et al.
7,896,825 B2 3/2011 Atkinson et al.
7,947,068 B2 5/2011 Grahn et al.
8,021,314 B2 9/2011 Filtvedt et al.
8,100,887 B2 1/2012 Weston et al.
8,182,521 B2 5/2012 Kane et al.
8,226,586 B2 7/2012 Cazzini et al.
8,287,474 B1 10/2012 Koenig et al.
8,361,001 B2 1/2013 Filtvedt et al.
8,460,355 B2 6/2013 Cazzini et al.
8,603,150 B2 12/2013 Kane et al.
8,657,796 B2 2/2014 Marasco
8,657,864 B2 2/2014 Rein et al.
8,663,198 B2 3/2014 Buan et al.
8,728,016 B2 5/2014 Reeves et al.
8,784,346 B2 7/2014 Barak et al.
8,821,422 B2 9/2014 Filtvedt et al.
10,420,699 B2 9/2019 Loori et al.
2002/0007836 A1 1/2002 Weyergans
2003/0097163 A1 5/2003 Kane et al.
2003/0125649 A1 7/2003 McIntosh et al.
2003/0144690 A1 7/2003 Zheng et al.
2004/0010212 A1* 1/2004 Kuiper .................. A61F 5/0104
601/152
2004/0030411 A1 2/2004 Caspers
2004/0154666 A1 8/2004 Gessat et al.
2004/0210176 A1 10/2004 Diana
2005/0027218 A1 2/2005 Filtvedt et al.
2005/0137446 A1 6/2005 Rastegar et al.
2005/0261615 A1 11/2005 Weston
2008/0015640 A1 1/2008 Kaiser
2008/0097252 A1 4/2008 Babaev
2008/0261615 A1 10/2008 Kalhan
2009/0048649 A1 2/2009 Peret et al.
2009/0107461 A1 4/2009 Ulrey et al.
2009/0143719 A1 6/2009 Loori et al.
2009/0177184 A1 7/2009 Christensen et al.
2009/0270910 A1 10/2009 Hargens et al.
2009/0312675 A1 12/2009 Sampson et al.
2010/0152633 A1 6/2010 Rein et al.
2011/0000484 A1 1/2011 Melsheimer
2011/0130712 A1 6/2011 Topaz
2011/0197554 A1 8/2011 Ruetenik
2011/0288458 A1 11/2011 Jones et al.
2011/0295168 A1 12/2011 Mangrum et al.
2012/0238924 A1 9/2012 Avni
2014/0128781 A1 5/2014 Rein et al.
2014/0276254 A1 9/2014 Varga et al.
2014/0276288 A1 9/2014 Randolph et al.
2015/0065931 A1 3/2015 Alnabulsi et al.

(56) References Cited

U.S. PATENT DOCUMENTS

| | | | |
|---|---|---|---|
| 2015/0297909 | A1 | 10/2015 | Peashock |
| 2016/0262971 | A1 | 9/2016 | Doron et al. |
| 2017/0050020 | A1 | 2/2017 | Yang |

FOREIGN PATENT DOCUMENTS

| | | | |
|---|---|---|---|
| EM | 0026509370001 | | 3/2015 |
| EM | 0026509370002 | | 3/2015 |
| EM | 0026509370003 | | 3/2015 |
| EM | 0026509370004 | | 3/2015 |
| EM | 0026509370005 | | 3/2015 |
| EP | 1884226 | A1 | 2/2008 |
| EP | 1929980 | A1 | 6/2008 |
| EP | 1736132 | B1 | 9/2011 |
| FR | 1562252 | A | 4/1969 |
| JP | H10192354 | A | 7/1998 |
| JP | 2005288068 | A | 10/2005 |
| JP | 1267330 | S | 4/2006 |
| WO | 9840039 | A1 | 9/1998 |
| WO | 0180790 | A1 | 11/2001 |
| WO | 03045289 | A1 | 6/2003 |
| WO | 2004058131 | A2 | 7/2004 |

OTHER PUBLICATIONS

Office Action from corresponding Japanese Application No. 2020-539151, May 24, 2022.

Allen et al., "Intermittent Pressure and Suction in the Treatment of Chronic Occlusive Arterial Disease," The Journal of the American Medical Association, vol. 105, No. 25, Dec. 21, 1935, pp. 2029-2034.

De Takats, "Obliterative Vascular Disease: Preliminary Report on Treatment by Alternating Negative and Positive Pressure," Journal of the American Medical Association, vol. 103, No. 25, Dec. 22, 1934, pp. 1920-1924.

Herrmann et al., "The Conservative Treatment of Arteriosclerotic Peripheral Vascular Diseases: Passive Vascular Exercises (Pavaex Therapy), " Annals of Surgery, vol. 100, No. 4, Oct. 1934, pp. 750-760.

Herrmann et al., "Passive Vascular Exercises: Treatment of Peripheral Obliterative Arterial Diseases by Rhythmic Alternation of Environmental Pressure," Archives of Surgery, vol. 29, No. 5, Nov. 1934, pp. 697-704.

Landis et al., "The Effects of Alternate Suction and Pressure on Blood Flow to the Lower Extremities," The Journal of Clinical Investigation, vol. 12, No. 5, Sep. 1933, pp. 925-961.

Landis et al., "Treatment of Peripheral Vascular Disease by Means of Suction and Pressure," Annals of Internal Medicine, vol. 9, No. 3, Sep. 1, 1935, pp. 264-273.

Meyer et al., "Bier's Hyperemic Treatment," California State Journal of Medicine, vol. 8, No. 4, Apr. 1910, pp. 142-143.

Reid, "Diagnosis and Treatment of Peripheral Vascular Diseases," The American Journal of Surgery, vol. 24, No. 1, Apr. 1934, pp. 11-35.

Theis et al., "Peripheral Circulatory Diseases Effect of Alternating Positive and Negative Pressure Treatments on Venous Blood and the Skin Temperatures: Preliminary Report," The Journal of the American Medical Association, vol. 107, No. 14, Oct. 3, 1936, pp. 1097-1104.

Goodney et al., "National Trends in Lower Extremity Bypass Surgery, Endovascular Interventions, and Major Amputations", Journal of Vascular Surgery vol. 50 No. 1, Jul. 2009, pp. 54-60.

Hiramori et al., "Impact of Runoff Grade After Endovascular Therapy For Femoropopliteal Lesions", Journal of Vascular Surgery, vol. 59, No. 3, Mar. 2014, pp. 720-727.

Norgren et al., "Inter-Society Consensus for the Management of Peripheral Arterial Disease (TASC II)", Journal of Vascular Surgery, vol. 45, No. 1, Supplement S, Jan. 2007, p. S5A-S67A.

Rowe et al., "Patterns of Treatment for Peripheral Arterial Disease in the United States: 1996-2005", Journal of Vascular Surgery vol. 49, No. 4, Apr. 2009, pp. 910-917.

Siracuse et al., "Results for Primary Bypass Versus Primary Angioplasty/Stent for Intermittent Claudication Due to Superficial Femoral Artery Occlusive Disease", Journal of Vascular Surgery, vol. 55, No. 4, Apr. 2012, pp. 1001-1007.

"NANOVA Therapy System," Acelity, retrieved from https://www.acelity.com/products/nanova-therapy-system-uk on Aug. 27, 2018, 11 Pages.

International Search Report from PCT Application No. PCT/IB2018/057616, Jan. 16, 2019.

Japanese Office Action from JP Application No. 2018-008307, Jan. 8, 2019.

Online Mail Order Catalog, Felissimo, Jan. 3, 2016, 6 Pages, https://www.felissimo.co.jp.

Japanese Office Action from corresponding Japanese Patent Application No. JP 2020-539151, Aug. 30, 2020.

* cited by examiner

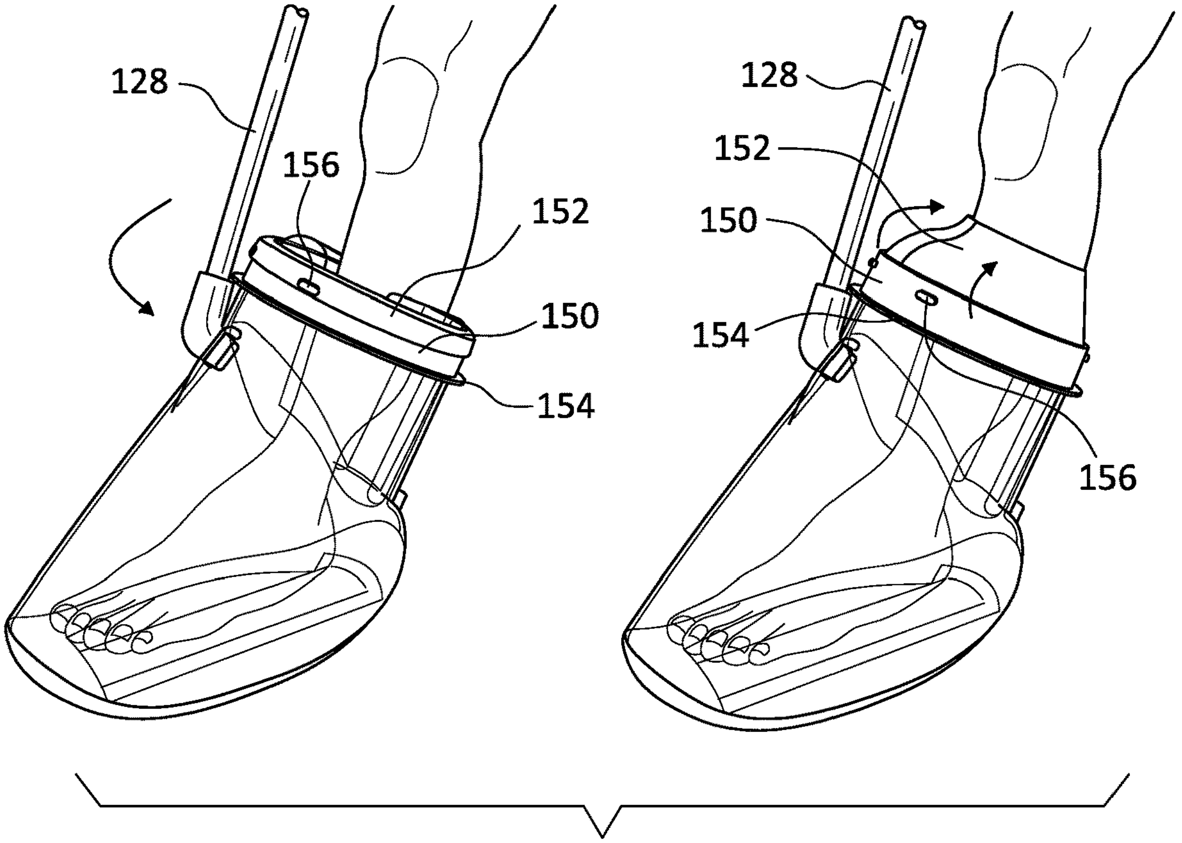
FIG. 5
FIG. 6
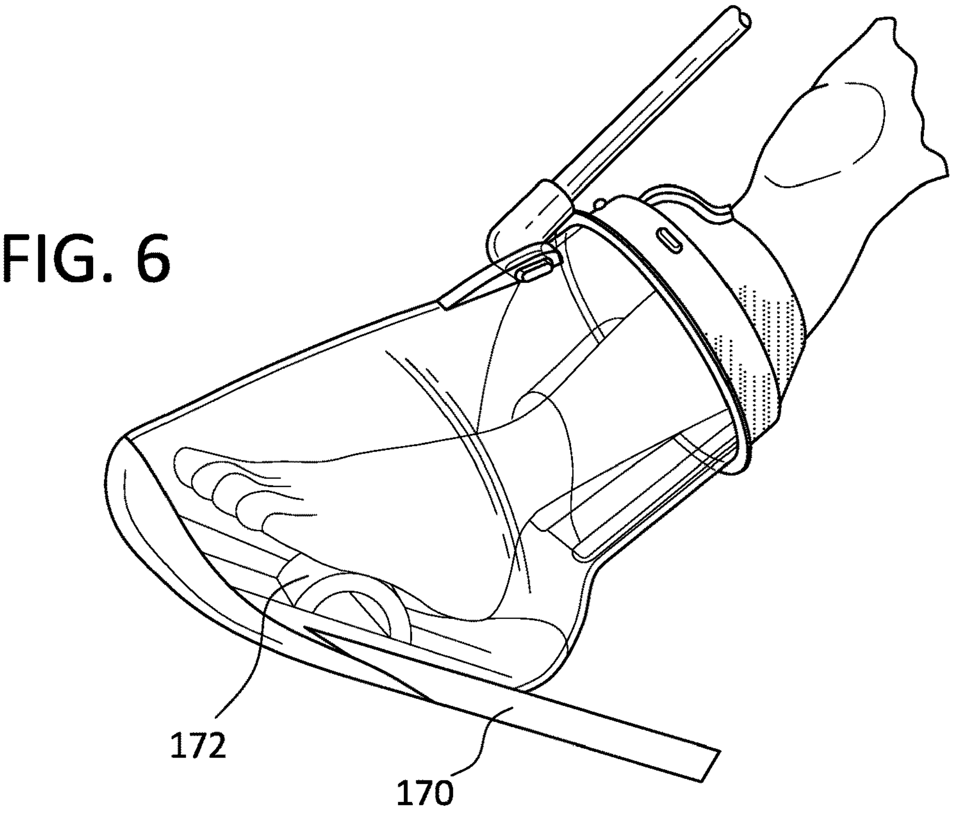

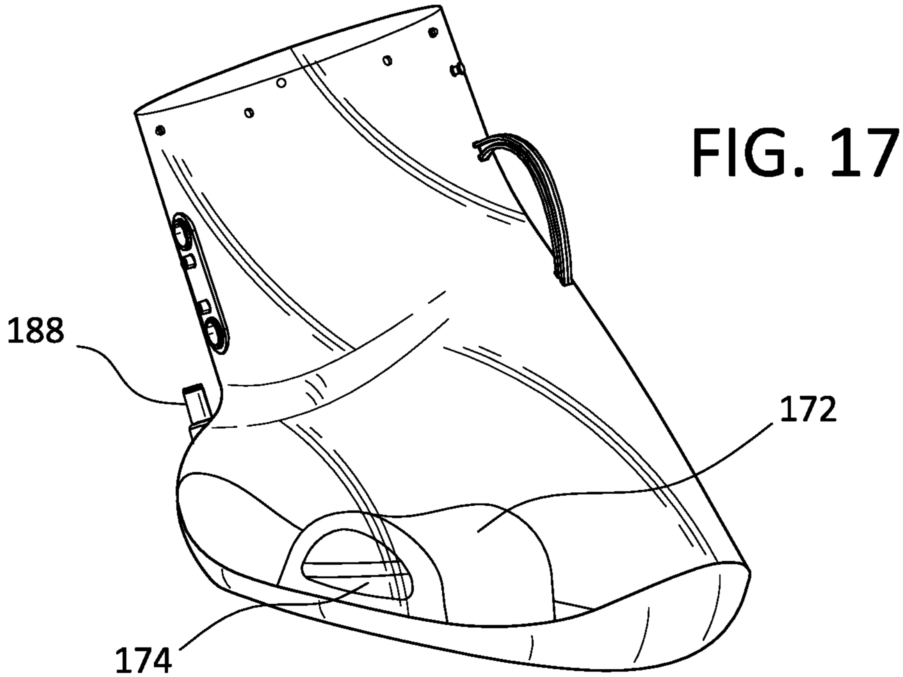
FIG. 17
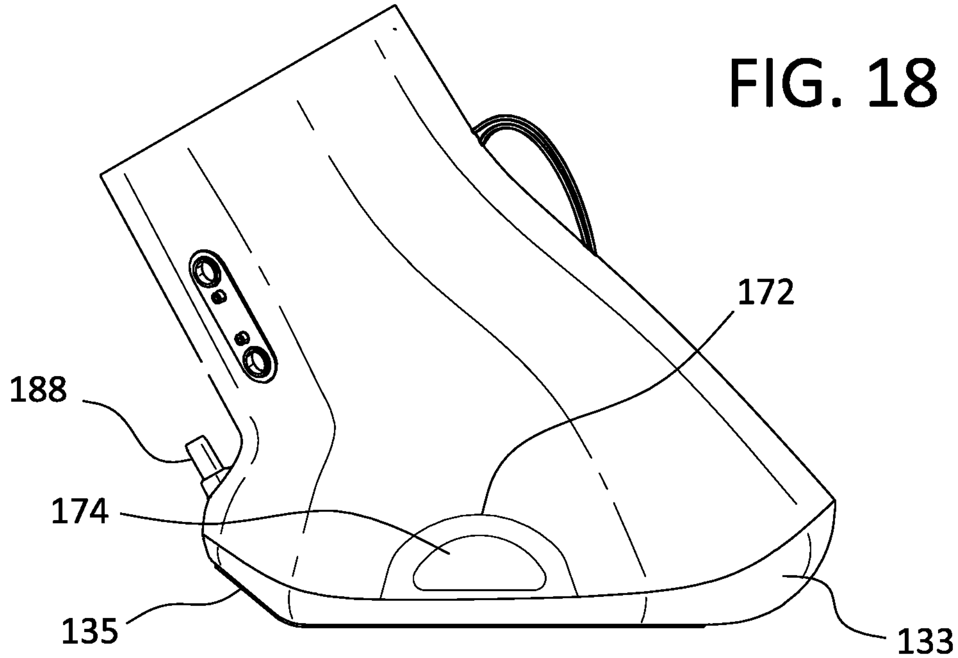
FIG. 18
FIG. 19
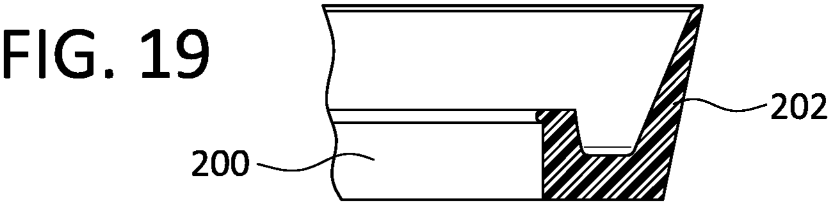

MEDICAL PRESSURE THERAPY DEVICE AND COMPONENTS THEREOF

FIELD OF THE DISCLOSURE

The disclosure relates generally to medical devices for applying pressure therapy.

BACKGROUND

Many medical conditions can be treated with controlled application of pressure to a patient's body. Healthcare or emergency medical professionals may apply pulsating pressure to a patient's body, such as by massage, to increase blood velocity in the region where the pulsating pressure is applied or in neighboring regions. This pressure therapy can provide a number of benefits by increasing peripheral circulation and/or lymphatic circulation, promoting blood flow, effecting redistribution of blood flow and diffusion, promoting healing of tissues (e.g. wound healing and growth of new blood vessels) by increased blood flow, and increasing the flow of substances between vessels and cells through increased diffusion.

These effects can be employed as part of a treatment regimen for patients suffering from conditions such as open wounds, chronic ulcers, burns, skin transplants, diabetic ulcers, edema, pain, conditions caused by inactivity, spinal cord injury, lymphedema, atherosclerosis, stroke, heart attack, or cancer.

Pressure therapy is also often employed for treating patients suffering from overheating or overcooling, such as heat stroke or hypothermia, in combination with external heating or cooling to help rapidly regulate a patient's temperature. The pulsating pressure can increase the rate at which temperature changes to the patient's limb are transferred to the patient's core, more effectively regulating the patient's core temperature than if the patient's limb was heated or cooled without pressure treatment.

In other situations, it may similarly be desirable to heat or cool patients for therapeutic purposes. Such situations may be during chemotherapy, before, after or during surgical intervention and where metabolism should be reduced for example during stroke or heart arrest. In other situations, one may want to pre-warm a patient before anesthesia to prevent or reduce hypothermia.

In its most basic form, a trained medical professional may apply pressure therapy in the form of a manual massage, but there have been efforts to improve and automate pressure therapy with pressure therapy devices. These devices can apply more precise pressure levels than a massage and can employ both negative pressure and positive pressure against a limb during treatment.

However, using pressure therapy devices is relatively new in clinical practice, and beyond the general application of pressure to a portion of a limb, few refinements or advances have been identified. There remains a need for developing new features in pressure therapy devices for increasing blood flow.

To apply pressure to a patient's body, known pressure therapy devices typically establish a controlled pressure environment, such as a pressure chamber, around the region of the user where the pressure is to be controlled. Pressure can then be adjusted within the closed environment of the pressure chamber by the removal or addition of air to the chamber.

Where pulsating pressure is to be applied to a patient's leg, for example, a controlled pressure environment may be established around the patient's foot and up the calf toward the thigh. This may involve positioning the patient's leg in a pressure chamber that isolates at least a portion of the leg from the ambient environment.

Proper placement of the patient's limb in a pressure chamber is often difficult, as users needing medical pressure therapy often suffer from limited mobility and flexibility due to old age or other debilitating conditions as recited above. Known pressure systems are also often large and difficult to adjust, while also being complex to operate, requiring the assistance of a trained medical professional to use safely and effectively.

During application of negative pressure in known devices, the negative pressure environment created inside of the pressure chamber may draw the patient's limb deeper into the pressure chamber and against interior edges or surfaces of the device. This can cause pressure points on the patient's limb, potentially limiting blood circulation through the patient's limb, and causing contusions, discomfort, necrosis or creating other undesirable impacts.

Patients suffering from the conditions listed above also often have fragile skin, which may be damaged unless properly protected from edges and protrusions. If the patient's limb is drawn into the closed end of the pressure chamber, contact between the patient's limb and the wall of the pressure chamber may create a contact point of high pressure that can damage to fragile skin. This can impose a particular risk to patients with neuropathy and/or limited skin blood flow.

In other devices, a limb may be supported or protected by padding structures, which must be custom-fitted or -shaped to individual users to provide sufficient support and avoid pressure points on the limb. Individual fitting requires additional time, materials, and the assistance of trained technicians. Alternative methods in the prior art may involve constructing a pressure chamber on or to fit a limb, which is similarly expensive and difficult to construct.

Sealing of the pressure chamber about a patient's limb is likewise difficult due to the irregular variations in the anatomy of a user, combined with the need to have a large opening to allow insertion of legs with limited ankle mobility. Prior art methods often require resilient sealing components under high tension, which are often uncomfortable, often require assistance to apply, and may induce pressure points on the skin and be difficult for a user to adjust.

From the above, known negative pressure systems are not configured for use by unskilled patients, and may require special fittings, complex components and pressure generators to ensure appropriate levels of pressure are generated and released without damaging the vulnerable limb of a patient. These complex systems are often expensive to manufacture and cost prohibitive for use on a consumer scale.

It is a concern that the difficulty of using known pressure therapy devices may discourage patients from receiving needed treatments. There is also a concern that a pressure therapy device may be used incorrectly, with ineffective and/or potentially harmful pressure levels or limb placement, without intervention from a trained technician.

It is desired to provide only a few sizes of components for pressure therapy devices, minimizing the need for customization while providing increased support for a patient's limb and maximizing exposure of the limb to pressure therapy. There is a need for a medical pressure therapy device that permits simple placement and adjustment of a pressure chamber about a limb, including means of sealing and applying pressure therapy to the limb while improving the efficacy of pressure therapy actuated by the device on a limb.

It is further desired to provide a pressure therapy device having safety features that ensure the device is simple and safe to operate both in and out of a clinical setting, and that are capable of inexpensive production.

Likewise, there is a need for pressure therapy devices capable of more advanced features, that do more than simply apply a negative or positive pressure to a portion of a limb.

SUMMARY

According to the embodiments described herein, a pressure therapy device is arranged for creating pressure therapy for a user, particularly over a patient's limb. The pressure therapy device enables the application of pressure to a limb within an enclosed environment, while offering a superiorly comfortable fit, safety features, improved support and simple placement of a limb.

Improvements of the pressure therapy device over prior art devices and methods may include novel components comprising a pressure chamber, seals, inflatable padding, and internal positioning mechanisms for supporting a patient's limb. The pressure therapy device may further be provided with a novel pump unit and valve systems, configured to improve the safety and usability of the device.

Indications for the pressure therapy device may include open wounds, diabetic ulcers, conditions caused by inactivity, spinal cord injury, lymphedema, atherosclerosis, heat stroke, hypothermia, stroke, heart attack, bone fractures, inflammation, swelling, tendonitis, muscle damage, or cancer.

Various embodiments of the pressure therapy device provide significant improvements over known pressure therapy devices in donning and fitting processes. The donning and fitting processes may be made without measurements and catered to anatomy and physical capabilities of a user. In particular, embodiments according to the current disclosure enable a patient to perform the donning and fitting of the device without assistance.

The pressure therapy device is further configured to adapt to the size and shape of an individual patient without intervention from a technician or other professional, such that the device is customized for optimal fit and performance.

Embodiments of the disclosure may include pressure chambers with streamlined features, including a large opening and angled neck to facilitate insertion of a limb without flexion of a joint and allow a relaxed position for a limb during use. The bottom surface of the pressure chamber may be made of a molded material and be provided with a flat base with a slanted end.

The pressure therapy device may be arranged to be adjustable by a user in a sitting position by providing means for lifting and turning the device from a distance, increasing the ease and comfort of a user during use as compared to known devices. The pressure therapy device may be adapted to cooperate with external support features for holding or repositioning the device in a preferred position.

These features reduce weight, size and bulk over known pressure therapy devices and permit donning of the device without requiring excessive exertion or bending and rotation of a limb.

According to an embodiment of a pressure therapy device, the pressure therapy device includes a pressure chamber having a first end and a second end, and anterior and posterior exterior surfaces. The first end defines an opening configured to widen from a receiving region into a pressure region adapted for receiving and enclosing a limb.

Where prior art devices frequently have a distinct boot shape that narrows at an ankle or lower leg of a user, embodiments of the current disclosure may comprise an oversized opening and interior region. The opening may be configured to be a predetermined size that extends into the receiving region and forms a short "neck" before expanding into the interior of the pressure chamber, such that a limb may be passed through without rotation or bending of the limb, which is often difficult or painful for a user. The foot and lower leg of a user may be introduced through the opening and the neck of the pressure chamber at a 90° angle, without rotation or flexion of an ankle.

The anterior and posterior exterior surfaces of the pressure chamber may form a certain angle, such that the distance between the anterior and posterior surfaces increases towards the second end of the pressure chamber at a predetermined rate along a height of the pressure chamber. The arrangement allows the wide opening to expand into a wider area within the chamber without tight angles, particularly in the anterior surface.

According to an embodiment of the pressure chamber, the anterior surface may be configured to be straight and to extend at a constant angle from the neck of the opening of the pressure chamber. The straight surface advantageously allows the user to insert a foot and lower leg at a 90° angle without the toes of the user contacting the surface of the pressure chamber, which may be painful or otherwise cause difficulty in donning and doffing of the device.

The second end of the pressure chamber is closed by a support surface, the support surface having a flat portion and an angled portion at least at a posterior end. The angled portion and the flat portion are adapted to allow angular adjustment and stable placement of the pressure chamber both during insertion of a limb and during operation of the device.

When inserting or removing the limb from the pressure chamber, the angled portion may be a heel rest for stabilizing the pressure chamber in an upright position. With the pressure chamber in the upright position, the user may insert the limb without rotation or bending of the limb. The foot and the lower leg of the user may be inserted from a sitting position without rotating the ankle by only raising the leg and extending the knee.

Once contact is made by the limb against the lower surface of the pressure chamber, the pressure chamber may rotate forward to lie on the flat portion for a stable, comfortable and consistent treatment position.

The support surface may comprise friction enhancing materials on an exterior surface, such as a rubber-like material to prevent the pressure chamber from slipping while in use.

The exterior surfaces of the pressure chamber may also be configured to be transparent and may include indicia for proper positioning of a limb, such that a user may have a clear view of the limb as it is positioned. A clear view of the positioning of a limb is beneficial for users suffering from neuropathy, who may lack the ability to feel pressure or touch on a limb and must be able to see the limb floating freely.

The anterior exterior surface may include a first locking element arranged to engage an adjustment piece. The adjustment piece may extend toward the first end of the pressure chamber for manipulation by a user and may be detachably fixed to the pressure chamber at a position near the opening to increase leverage. The adjustment piece may comprise a detachable handle and would allow the user increased control of the positioning of the pressure chamber during use.

Embodiments of the pressure therapy device may secure and position the limb of the user within the pressure chamber using an inflatable padding and a seal positioned at the first end of the pressure chamber. The first end may include second locking elements for securing the inflatable padding through the opening and in the receiving region of the pressure chamber.

The second locking elements may be configured to engage receiving elements on the inflatable padding such that the proper positioning of the inflatable padding is clear and repeatable for the user.

The seal may be configured to surround the opening of the pressure chamber and the inflatable padding, and to engage the second locking elements with no additional belts.

In an embodiment the inflatable padding may engage the second locking elements on an exterior surface of the first end of the pressure chamber in a predetermined position and extend into the opening and receiving region of the pressure chamber. In an alternative embodiment the inflatable padding may engage the second locking elements on an interior surface of the first end of the pressure chamber.

The inflatable padding may be deflated to allow insertion of the limb of the user through the opening of the pressure chamber and may be configured to adopt a shape corresponding to the limb of the user when inflated. In doing so, the inflatable padding may further be adapted to inflate and close the opening of the pressure chamber about the limb.

The inflatable padding may be provided with a valve for inflating and deflating with limited intervention by a user. The valve may be a check valve, non-return valve or one-way valve adapted to inflate the inflatable padding in response to a negative pressure in the pressure chamber by drawing air from ambient surroundings into the inflatable padding, and to deflate only when the valve is opened by a user or at a predetermined interval.

Using the one-way valve with a negative pressure allows for an automatic inflation of the inflatable padding during operation of the pressure therapy device and has been surprisingly discovered to provide a further massaging effect on the limb of the user during therapy. The massaging effect occurs due to the inflatable padding being closed to ambient pressure, such that following a release of negative pressure in the pressure chamber an overpressure is generated within the inflatable padding.

Where the negative pressure draws blood into the limb of the user, the overpressure causes the inflatable padding to slightly squeeze or massage the limb of the user at the same moment as the limb of the user is released from the effects of the negative pressure in the pressure chamber, e.g. as atmospheric pressure is restored. This squeezing or massaging effect helps accelerate the blood pulled into the limb of the user by the negative pressure and increases blood flow through the limb.

The dual benefit of negative pressure around the limb combined with positive pressure applied by the inflatable padding is achieved simply by utilizing the existing dynamic between the negative and atmospheric pressure; that is, the introduction of negative pressure causes the inflatable padding automatically to inflate. The massaging effect is achieved without the need to generate a positive pressure in the pressure chamber and allows the pressure therapy device to apply both positive and negative pressure to the limb with no complex pumping systems.

The valve of the inflatable padding may be configured as a lever actuated valve opened when the seal is pulled away from a limb of a user, as a timed valve or as a manually actuated valve, such that the user may easily deflate the inflatable padding for removing the limb from the pressure chamber.

In an alternative embodiment, the inflatable padding may be configured to communicate with a pump unit, such as with a three-way valve.

The thickness of the material of the inflatable padding may be configured such that greater or lesser pressure or overpressure is applied to a limb. Where the material of the inflatable padding is thick or more resilient, the inflatable padding resists expansion, while the reverse is true of a thin or flexible material.

In an embodiment, the inflatable padding comprises at least two air chambers such that the limb may be appropriately positioned in the pressure chamber. Using an inflatable padding having only one air chamber fills unevenly, as the air in the padding will redistribute according to the resistance provided by the limb. Where an inflatable padding comprises only one air chamber the padding may not appropriately position the limb but may allow the limb to rest against the side or back of the pressure chamber due to the weight and position of the limb.

The inflatable padding may comprise a seamless material, a single mold material, or a material having multiple welds. The inflatable padding may thereby present a smooth interior surface free from protrusions or recessed areas that may cause discomfort, indentations or marks on the skin of a user.

The inflatable padding may be made of polyvinyl chloride (PVC) or polyurethane (PUR), and may have a flocked surface. A PUR material is advantageous due to the increased friction provided relative to a PVC or flocked material. The inflatable padding may be provided with different surface types or treatments, such as a sticky surface for better retaining the limb of a user, a smooth surface, or a padded surface for increasing comfort of a user.

In some configurations, the inflatable padding may have a uniform length, or may have an anterior length that is shorter than a posterior length, in order to better grip the posterior portion of a limb and to better support the limb at a resting side, for example the posterior side of a leg. The inflatable padding may also extend beyond the opening of the pressure chamber in a proximal direction in order to better grip the limb and protect the limb from the edges of the opening of the pressure chamber.

In one embodiment the inflatable padding may have an extension of 5 to 20 mm beyond an upper edge of the pressure chamber to protect the limb from contact with a hard edge of the pressure chamber.

The seal of the pressure therapy device is configured to surround the opening of the pressure chamber and the inflatable padding at the first end of the pressure chamber, such that a portion of the user's limb is enclosed therein. The seal is configured to tightly grip the limb of the user, such that the interior of the pressure chamber may be separated from ambient pressure.

The seal may comprise a frustoconical cuff or a cone made of an elastic material having a first and a second end. The first end of the cuff may be adapted to engage with the second locking elements at the first end of the pressure chamber and may have a decreasing diameter as it extends away from the opening to the second end of the cuff. The second end of the cuff may be positioned eccentric to the first end, having a center axis being posterior to a center axis of the first end of the cuff to naturally position the limb in the preferred position without user intervention.

Using the frustoconical cuff with the second end eccentric to the first end has been found to advantageously allow the seal to easily and intuitively adapt to the irregular shape of the anatomy of a user. In particular, the described shape of the seal can close small dips or grooves in the anatomy of the user, such as are common on an anterior surface of the lower leg, where the tibia may narrowly protrude from the calf.

The surface of the seal may be provided with friction enhancing materials or with a smooth surface for improving sealing to a limb, and to facilitate rolling back and securing the seal about the opening of the pressure chamber during insertion of a limb. The first end of the seal may further be provided with protrusions for securing the seal in an open or rolled position.

The seal preferably has a length sufficient to engage the patient's limb about a predetermined distance, to ensure a good seal and prevent the formation of pressure points. An exterior surface of the seal may be provided with indicia for trimming or cutting, to adjust the length of the seal or the diameter of the second end of the seal.

As the seal is configured to tightly grip the limb of the user, the exterior surface of the seal may be provided with a pull tab to facilitate intuitive grasping and opening of the seal by the user.

The seal may comprise an elastic material, and may be configured to have a variable thickness, such that the first end of the cuff is thicker than the second end. The thicker material of the first end enables a more secure attachment to the pressure chamber, while the thinner material of the second end facilitates opening and rolling back of the seal by a user. The seal may be manufactured by injection molding, where an injection point comprises the circumference of the second end of the cuff to avoid a single injection point that would be susceptible to tearing after repeated use and an uncomfortable fused seam.

A modular component may be added to certain embodiments of the medical pressure therapy device to enable the application of additional treatment options to the limb. Examples of a modular component that may be coupled with the pressure therapy device may include a heating or cooling unit, vibration unit, electrical stimulation unit, etc. The modular component improves the efficacy of the medical pressure therapy device in treating particular conditions, including hypothermia, heat exhaustion, etc., and may be placed in a modular space in the support surface of the pressure chamber. The modular space may be configured to receive a plurality of interchangeable modular components having different functions.

In an embodiment of the pressure therapy device, the exterior of the pressure chamber is provided with a stabilizing structure to hold the pressure chamber in a predetermined position, such as to facilitate a seated position for a user. The stabilizing structure may be adjustable to different lengths and may comprise at least one stabilizing piece fixed to the pressure chamber. The at least one stabilizing piece may be curved or straight, and may cooperate with an adjustment mechanism provided on the pressure chamber.

In other embodiments the stabilizing structure may be separate from the pressure chamber and may be configured to adjust to the position of the pressure chamber and hold the pressure chamber in place, such as with a bean bag, sling or inflated pillow.

The pressure chamber may include a positioning mechanism inside the pressure chamber, for indicating and supporting the proper positioning of a limb. The positioning mechanism may be configured to provide support to an arch of a foot, without contacting the heel and ball of a foot.

Using the positioning mechanism has been shown to increase usability of the pressure therapy device, by facilitating consistent and correct positioning of the limb within the pressure chamber, and surprisingly achieves a further massaging effect during negative pressure cycles to force blood from the vascular bed under the foot. The positioning mechanism may be configured to contact the limb of the user only at a particular point, such as in the arch of the foot, to avoid wounds commonly found on the heel or pad of the foot.

In an alternative embodiment, the positioning mechanism may be configured to extend from the pressure chamber in a releasable configuration, such that when contacted by the limb of the user, the mechanism is moved away from the limb to prevent the mechanism from contacting the limb after positioning the limb is complete. Using the releasable positioning mechanism allows for consistent placement of the limb, while leaving the limb hanging freely within the pressure chamber. In another embodiment the positioning mechanism may collapse in response to a negative pressure.

Such a free hanging configuration may be advantageous where a wound is present on the bottom of the limb of the user.

According to an embodiment of the pressure therapy device, the pressure chamber is connected to the pump unit for providing a non-atmospheric pressure within the pressure chamber. The pump unit may provide an alternating pressure, such that a first period of non-atmospheric pressure is followed by a second period of non-atmospheric or atmospheric pressure. Additional embodiments and description are provided in U.S. Pat. No. 7,833,179, issued Nov. 16, 2010; U.S. Pat. No. 7,833,180, issued Nov. 16, 2010; U.S. Pat. No. 8,021,314, issued Sep. 20, 2011; U.S. Pat. No. 8,361,001, issued Jan. 29, 2013; U.S. Pat. No. 8,821,422, issued Sep. 2, 2014; and U.S. Pat. No. 8,657,864, issued Feb. 25, 2014, which are incorporated herein by reference.

The pump unit may include a first valve system configured to operate as a one-way valve with a safety release feature. The first valve system may include a chamfered washer for closing a tube or line. The chamfered washer may comprise through holes and be placed against an elastic covering configured to fit the tube and close the through holes of the chamfered washer.

The chamfered washer and the elastic covering define a central opening, providing communication between a pressure region side and an atmosphere or pump side of the tube or the valve. A sealing unit, such as a ball, is configured to fit to the dimensions of the central opening and seal the first valve system closed. Due to the chamfered edge and the elastic covering the sealing unit can be engineered with a high tolerance while still preventing leaks.

At a predetermined pressure level, the sealing unit may be moved from the central opening to allow communication to atmospheric pressure, preventing the interior pressure from reaching unsafe levels. In the first valve system, the mass of the sealing unit and the dimensions of the central opening calibrate the first valve system to a predetermined pressure range and prevent misuse or injury from high pressures.

The chamfered washer may define additional openings not defined by the elastic covering. In this configuration the elastic covering acts as a one-way valve, opening the additional openings or through holes to allow air to be removed from the pressure region side during operation of the pump and sealing the negative pressure of the pressure region side when the pump is idle. The additional openings are closed by the elastic covering under a negative pressure and opening under a positive overpressure.

The elasticity of the elastic covering may be configured to calibrate the first valve system to a predetermined pressure range. The elastic covering may also be pre-stretched to prevent the covering from moving or stretching into the central opening or the additional holes.

In an embodiment the first valve system may include a leverage arm, configured to displace the sealing unit at a predetermined time or in response to a predetermined event, to control the application and release of non-atmospheric pressure. In an embodiment, the leverage arm may be adapted to displace the sealing unit upon activation of the pump unit, such that the pump unit may remove air from the pressure region side, and to release the sealing unit on deactivation of the pump unit, such that the opening is sealed.

The first valve system or the pressure chamber may also be provided with a permanent opening or leak valve. The leak valve is configured to provide a small opening to atmospheric pressure, such that the pressure within the chamber is slowly adjusted back to atmospheric levels when the pump unit is not operating. Using the leak valve helps prevent misuse, such as unsafe pressure levels and/or pressure levels maintained for unsafe periods of time.

A similar leak hole may be provided in the inflatable padding and covered with tape for sealing the hole, such that the user may remove the tape and empty the inflatable padding if the valve of the inflatable padding fails.

The pump unit may include a piston configured to generate a non-atmospheric pressure. The piston may include elastic extensions or wings to increase engineering tolerance and reduce friction between the piston and a cylinder. The wings may also be configured with a predetermined elasticity, such that the wings fold inwards in response to a predetermined pressure and preventing the generation of unsafe pressure levels.

The pressure therapy device may include a control unit, including a processor and a memory, for operating the pump unit. The control unit may include sensors provided in the pressure chamber or other components, or on the limb of the user, for monitoring and recording the results of treatment. The control unit may be programmed by the user or by a medical professional, and be provided with software for ensuring compliance with a personalized treatment regimen.

In an embodiment, the control unit may be configured to receive programming from a removable memory, such as a flash drive, or to receive programming or communicate wirelessly. In this way a medical professional may access and update the information stored by the control unit.

The pressure therapy device may be provided as a kit including a combination of a pressure chamber, inflatable padding, pump unit, control unit and/or seal. The pressure therapy device may be configured to the needs and anatomy of a particular user by a technician or by the user due to the advantageous configurations of each part.

A method of using the pressure therapy device may comprise inserting the limb of the user through the opening of the pressure chamber, such that the pressure chamber, the seal and the inflatable padding surround the limb. Upon insertion of the limb, the inflatable padding may be in a deflated state and the seal may be in a retracted or rolled position, such there is space for the limb to pass through the opening of the pressure chamber without rotation of the limb.

Inserting the limb may further include rotating the position of the pressure chamber such that the pressure chamber is in an upright position on the flat portion of the lower surface when the limb is inserted. The limb may then contact the positioning mechanism within the pressure chamber and the pressure chamber may rotate to lie on the flat portion of the lower surface.

The seal may then be extended or unrolled to fit against the limb of the user and cover the opening of the pressure chamber and the inflatable padding therein.

Upon activation of the pump unit, the pump unit draws air from the pressure chamber through a conduit in the pressure chamber. In response to the negative pressure, the inflatable padding inflates through the valve and secures the limb in the opening of the pressure chamber, away from the edges and interior surfaces of the pressure chamber. The negative pressure likewise pulls the seal against the limb of the user and separates the interior of the pressure chamber from atmospheric pressure.

The negative pressure is applied to the limb in a pulsating fashion, while the inflatable padding remains inflated and applies a positive massaging effect on the limb during an over pressure period.

These and other features, aspects, and advantages of the present disclosure will become better understood regarding the following description, appended claims, and accompanying drawings.

BRIEF DESCRIPTION OF THE DRAWINGS

FIG. 5 shows a perspective view of the adjustment of a seal about a limb of a patient.

FIG. 6 shows a perspective view of a pressure therapy device with a stabilizing structure.

FIG. 17 shows a perspective view of a pressure chamber having a positioning mechanism.

FIG. 18 shows a side perspective view of a pressure chamber having a positioning mechanism.

FIG. 19 shows a zoomed perspective view of a portion of a piston having an elastic wing according to another embodiment.

Figure 1:
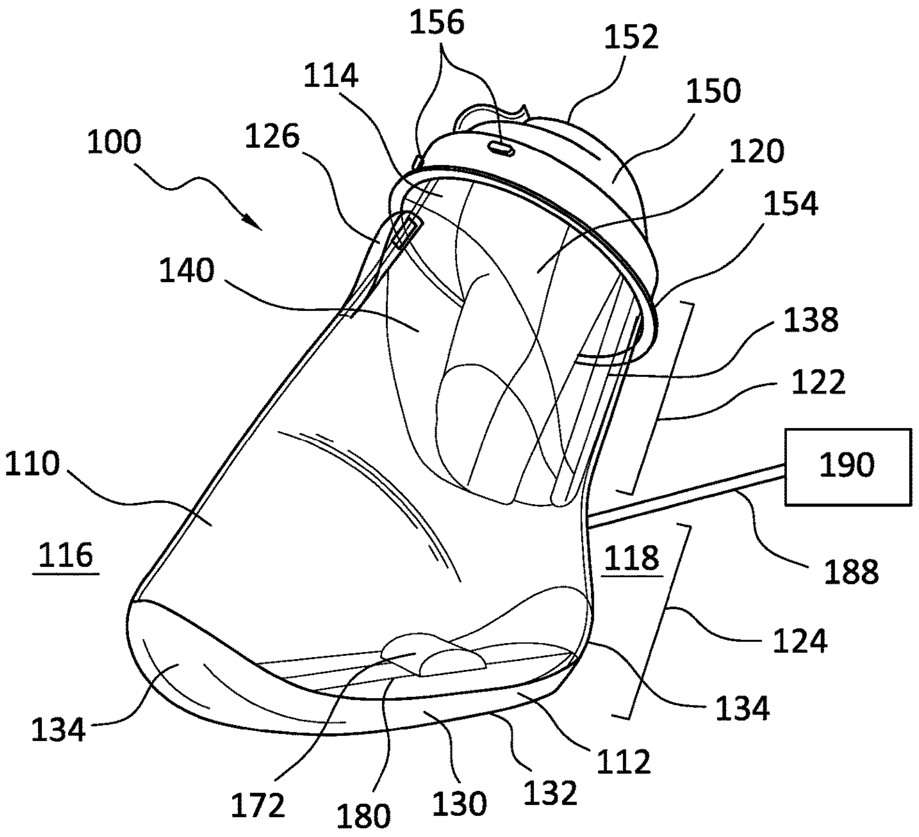
FIG. 1 shows a perspective view of a pressure therapy device.

The drawing figures are not drawn to scale, but instead are drawn to provide a better understanding of the components, and are not intended to be limiting in scope, but to provide exemplary illustrations.

DETAILED DESCRIPTION OF VARIOUS EMBODIMENTS

A better understanding of different embodiments of the disclosure may be had from the following description read with the accompanying drawings in which like reference characters refer to like elements.

While the disclosure is susceptible to various modifications and alternative constructions, certain illustrative embodiments are in the drawings and described below. It should be understood, however, there is no intention to limit the disclosure to the specific embodiments disclosed, but on the contrary, the disclosure covers all modifications, alternative constructions, combinations, and equivalents falling within the spirit and scope of the disclosure.

It will be understood that, unless a term is expressly defined in this disclosure to possess a described meaning, there is no intent to limit the meaning of such term, either expressly or indirectly, beyond its plain or ordinary meaning.

Numerous pressure therapy device embodiments and components for use therewith are described herein, with particular focus given to devices and components directed to a limb. The limb can be any part of a human or animal body that can be easily introduced into the device. A limb can comprise an arm or leg, a portion of an arm or leg (e.g. a forearm, hand, lower leg, or foot), or more than one of such parts of the body. While the pressure therapy device is described within the context of a preferred embodiment directed to a lower leg and foot, many features described herein may be extended to pressure therapy devices and components that secure other limbs and body parts.

The pressure therapy device embodiments and components for use therewith may be dimensioned to accommodate different types, shapes and sizes of human joints and appendages. In addition, embodiments may be modified to orient principal forces exerted by pressure systems of the embodiments at any desirable location. Embodiments may further be modified to secure the device onto a limb at any desirable location.

For explanatory purposes, each pressure therapy device embodiment or component thereof described herein may be divided into sections denoted by general anatomical terms for the human body. Such anatomical terms are provided to distinguish various elements of the device embodiments from one another, but which are not to be considered to limit the scope of the disclosure.

Each of these terms is used in reference to a human leg, by way of example, which is divided in similar sections with a proximal-distal plane. The terms "proximal" and "distal" generally refer to locations of the device that correspond to the location of leg relative to the point of attachment of the leg to the body. The terms "upper" and "lower" may be used in combination with "proximal" and "distal" to connote gradations in location of "proximal" and "distal."

The embodiments of the pressure therapy device can also be considered to fall within "anterior" and "posterior" sections of an anterior-posterior plane. The anterior-posterior plane generally corresponds to the coronal or frontal plane of a human limb which lies along the central longitudinal axis of a body. A posterior side or element is therefore behind this anterior-posterior plane, whereas an anterior side or element is in front of the anterior-posterior plane.

The terms "inwardly" or "inner" commonly used herein to distinguish the side of the device that may be specifically adjacent to the limb of the user of the device. Contrariwise, the term "outwardly" or "outer" are used to denote the side of the device that is opposite to the inwardly side.

According to the embodiments of the current disclosure, pressure therapy devices are disclosed having advantageous configurations of pressure chambers, seals, inflatable paddings, positioning mechanisms, pump units and the like. It is an advantage of these embodiments that the pressure therapy devices are easy to maneuver onto a limb, simple and safe to operate even by an untrained user, and comfortable to use while improving efficacy of pressure therapy actuated by the device.

FIG. 1 illustrates an embodiment of a pressure therapy device 100 having a pressure chamber 110 with first and second ends 112, 114 and anterior and posterior surfaces 116, 118. The anterior surface 116 may be provided with a first locking element 126 and the second end 114 defines an opening 120 to a receiving region 122 inside the pressure chamber 110 that widens into a pressure region 124 in the distal direction.

The pressure region 124 of the pressure chamber 110 may communicate with a pump unit 190 with a conduit 188 at a posterior side 118 of the pressure chamber 110. Embodiments of the pressure therapy device 100 are not limited to a particular location for the conduit 188, as long as the conduit 188 is in communication with the pressure region 124.

The pump unit 190 may be any suitable device for generating a non-atmospheric pressure within the pressure region 124, such as a vacuum pump. In a preferred embodiment the pump unit 190 is provided with additional safety and efficiency features such as a piston 200 for generating non-atmospheric pressure and a first valve system 210 for opening and closing the pressure chamber 110 from communication with ambient atmospheric pressure.

Figure 2:
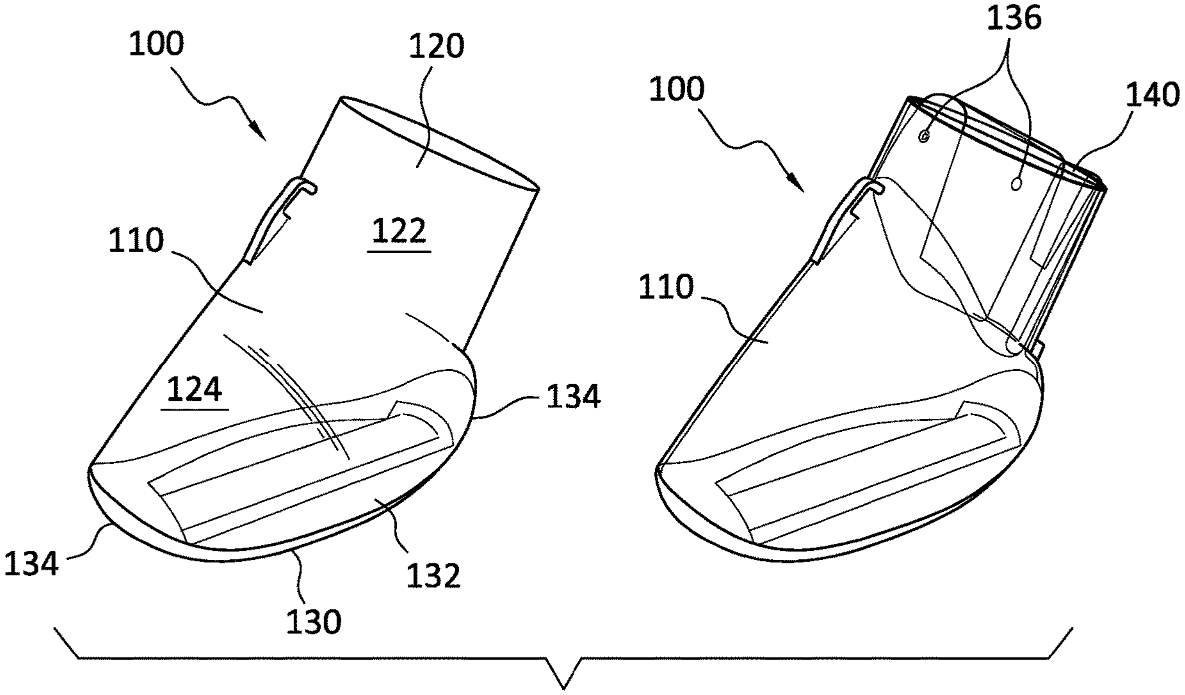
FIG. 2 shows a perspective view of the pressure chamber with and without an inflatable padding.
Figure 14:
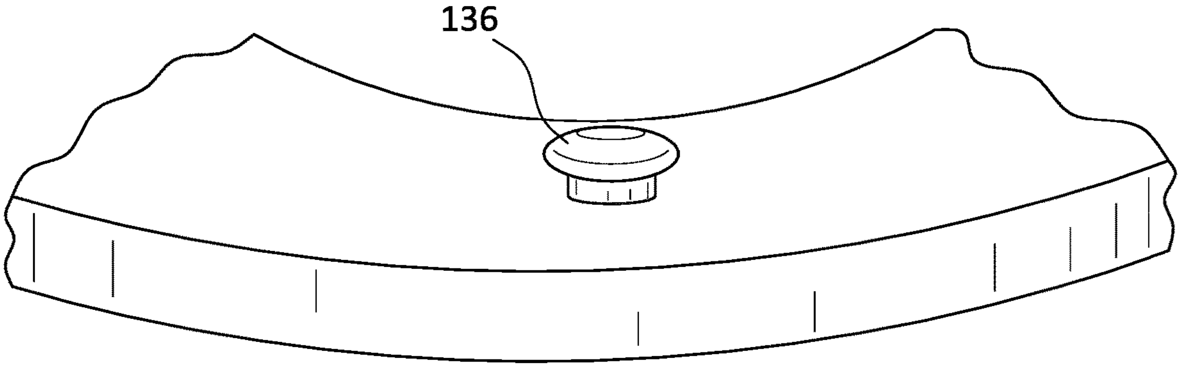
FIG. 14 shows a zoomed perspective view of at least one second locking element on an interior of the pressure chamber.

An inflatable padding 140 secures to the opening 120 of the pressure chamber 110 and extends through the opening 120 and into the receiving region 122. The inflatable padding 140 is secured to the pressure chamber 110 by at least one second locking element 136, as shown in FIGS. 2 and 14. The at least one second locking element 136 may be provided on the interior or exterior of the pressure chamber 110 and comprises a hook or extension for passing through a corresponding hole in the inflatable padding 140, such that the inflatable padding 140 may include an extension overlapping the exterior surfaces 116, 118 of the pressure chamber 110 before extending through the opening 120 and into the receiving region 122. The at least one second locking element 136 may have a total height of 1.5 mm and include a widened top, or knob, having a height of 0.5 mm.

Figure 15:
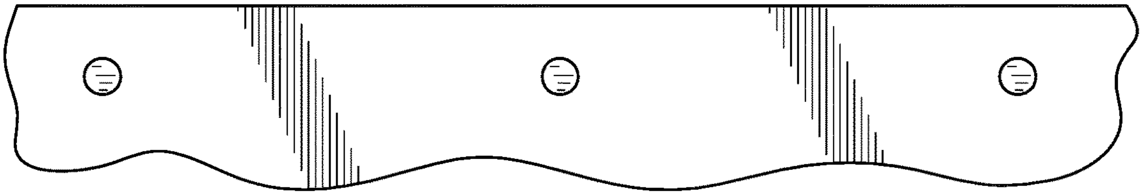
FIG. 15 shows a plan view of an example of holes corresponding to the at least one second locking element.

A portion of the inflatable padding 140 provided with the hole corresponding to the at least one second locking element 136 may be reinforced with an increased material thickness in order to better secure to the pressure chamber 110 and to provide an audible confirmation, or snap, indicating proper attachment. The increased material thickness may be provided by a plastic or fabric band, such as a hostaphan band 240, fixed to or incorporated into the inflatable padding 140. In one embodiment, the portion of the inflatable padding 140 has a thickness of 0.35 mm. The hole may be configured with a shape corresponding to the second locking elements 136, as demonstrated by the examples in FIG. 15.

The inflatable padding 140 may comprise a stretchable or non-stretchable material such as a thin polyurethane or PVC having a thickness of under about 1 mm, and may include padded felt or a friction enhancing surface. The inflatable padding 140 may be created in a single mold or in two welds to reduce the presence of seams that may create pressure points or leave marks on the limb of the user. The inflatable padding 140 may be provided with multiple chambers, such that portions of the inflatable padding 140 inflate separately about the limb of a user.

Figure 27:
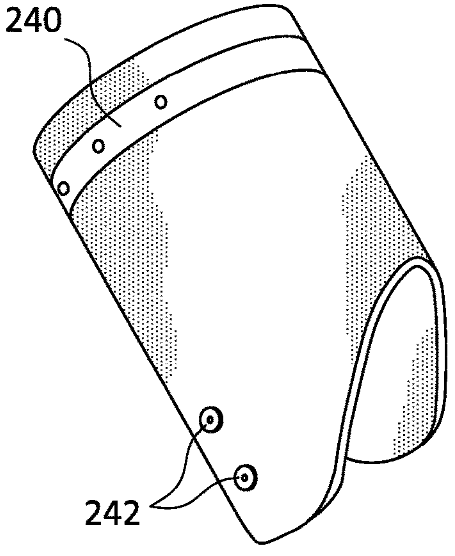
FIG. 27 is a perspective view of an inflatable padding.

In an embodiment, the inflatable padding 140 may be formed of an inner sheet and an outer sheet, such as TPU sheets, that each form a cylinder. The ends of the sheets are then welded together to form an air chamber therein. A band 240 and knobs 242 may also be incorporated or affixed thereon, as illustrated in FIG. 27. The band 240 and the knobs 242 allow the user to secure the inflatable padding 140 to the pressure chamber 110 only in the correct configuration, and to remove the inflatable padding 140 for cleaning or replacement.

In the depicted embodiment of FIG. 1 the inflatable padding 140 is inflated to grip the limb of a user and narrow the opening 120 to sealable dimensions. The inflatable padding 140 enables the use of an exceptionally wide opening 120 and facilitates placement of limbs having different sizes without requiring excessive rotation or bending of the limb and while still enabling an effective sealing of the pressure chamber 110. The inflatable padding 140 is configured to inflate and adjust the dimensions of the opening 120 to the anatomy of a user and compress about a limb.

The inflatable padding 140 may be configured to have a greater distal extension along a posterior side of the limb of a user than along an anterior side, as wounds are often more prevalent on the anterior side of the limb. The reduced distal extension on the anterior side in relation to the posterior side also allows a user to adjust the limb during treatment, increasing the comfort of a user. The distal extension is preferably limited such that the distal portion of the limb is free from contact with the inflatable padding, as wounds are often more prevalent on a distal portion of a limb (e.g. the heel and ball of a foot). This arrangement allows the inflatable padding 140 to effectively guide and support the limb of the user without putting undue pressure on sensitive or vulnerable areas.

In an embodiment the inflatable padding 140 may provide additional support and protection to the limb by extending beyond the pressure chamber 110 in a proximal direction up to 20 mm. The inflatable padding 140 may be configured to have a varying length, such that the distal extension of the inflatable padding 140 is shorter on an anterior side than on a posterior side, in order to better grip the back side of a limb while exposing more of the limb to the pressure within the pressure region 124. The inflatable padding 140 may also be provided with striped friction materials in order to better grip a limb.

A seal 150 secures to the pressure chamber 110, surrounding the opening 120 and extending beyond the pressure chamber 110 in a proximal direction. The seal 150 may be secured by means of the at least one second locking element 136 or with friction, such as friction against the limb. The seal 150 may be provided with a narrow opening 155 (shown in FIG. 12) to assist with securing and positioning of the seal 150. The seal 150 may comprise an elastic material with enhanced frictional properties, such that the seal 150 fits tightly about the limb of a user.

The seal 150 may comprise heat pressed silicone, thermoplastic elastomer (TPE), or TBE having a thickness of about 1-2 mm. The seal 150 may be configured with a material having a hardness within the range of 0-15 shore A, more preferably about 5 shore A, such that the material affixes firmly about the limb of a user without leaving indentations or marks.

Figure 3:
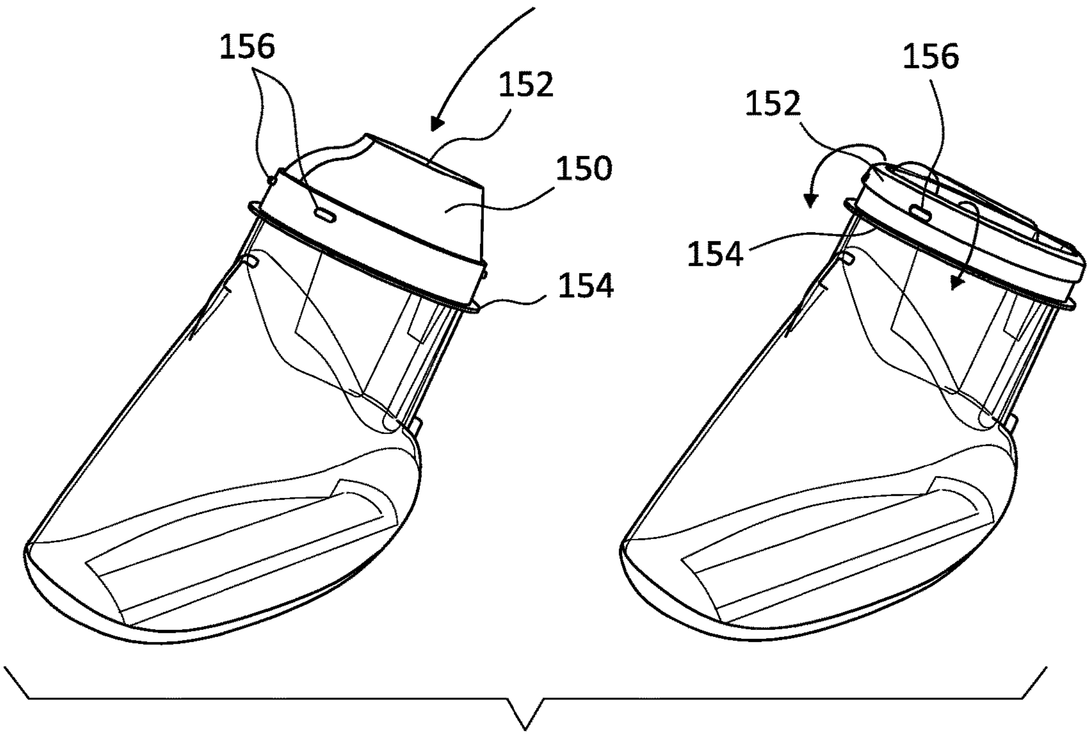
FIG. 3 shows a perspective view of the pressure therapy device with a seal in an extended and retracted position.
Figure 11:
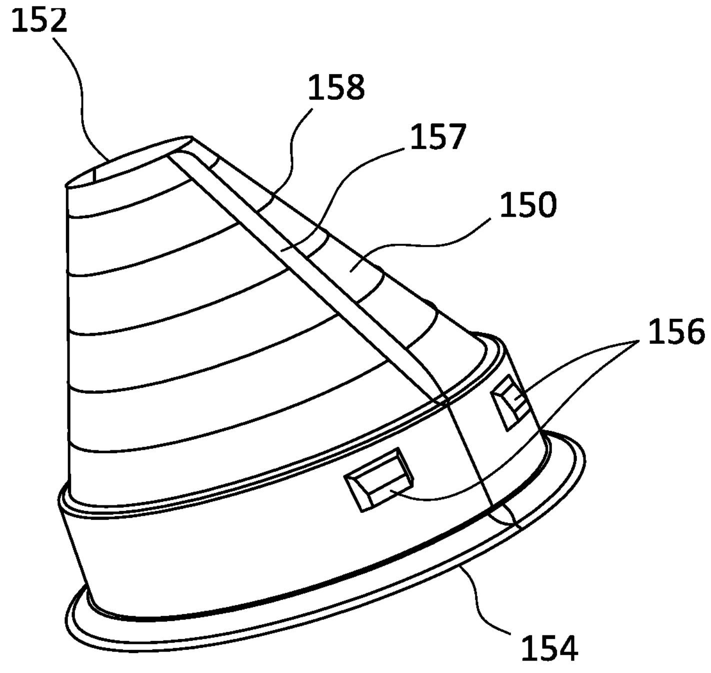
FIG. 11 shows a perspective view of a seal for use with a pressure therapy device according to the current invention.
Figure 12:
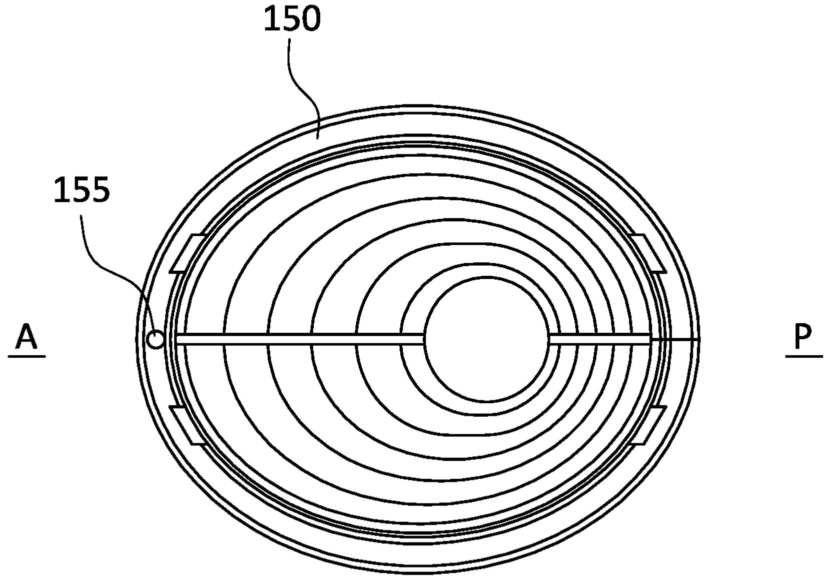
FIG. 12 shows a side perspective view of the seal of FIG. 11.
Figure 13:
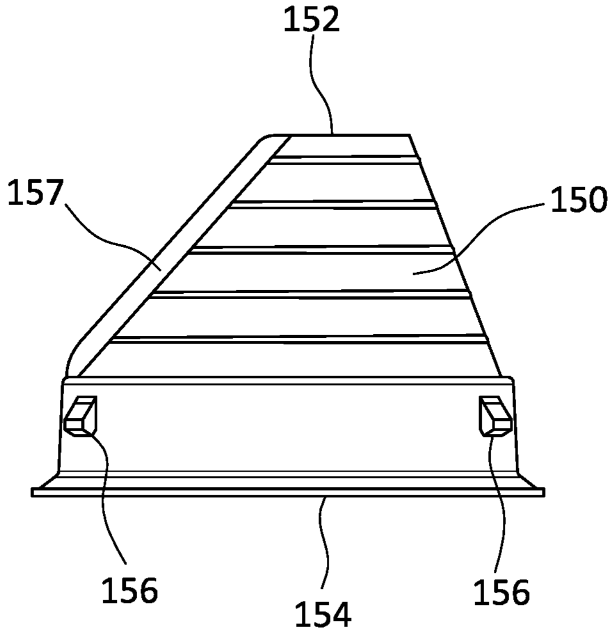
FIG. 13 shows a top perspective view of the seal according to FIG. 11.

As shown in FIGS. 3 and 11, the seal 150 may have a frustoconical shape including a proximal end 152 and a distal end 154. The proximal end 152 may have a center axis that is eccentric to a center axis of the distal end 154, such that a limb is positioned more in a posterior portion P of the opening 120, as shown in FIG. 12.

When secured about the limb of a user, a pull tab 157 may be configured to extend along the distal length of the seal 150 to enable a user to grip and open the seal 150 about the limb. The proximal end 152 of the seal 150 may be rolled back in a distal direction to widen an opening of the seal 150 for placement or removal of a limb. Protrusions 156 may be positioned on the distal end 154 to frictionally retain the seal 150 in a rolled position such that a user does not have to hold the seal 150 back during placement of a limb. This feature enables the use of the pressure therapy device 100 by individuals that do not have sufficient strength, dexterity, or mobility to manipulate a seal while also maneuvering a limb or the pressure chamber 110.

In one embodiment the seal 150 may have a variable thickness, such that the distal end 154 securing to the pressure chamber 110 has a greater thickness, for example 2 mm, than the proximal end 152, for example 1 mm. The increased thickness of the distal end 154 ensures a more secure attachment to the pressure chamber 110, while the reduced thickness of the proximal end 152 enables easier adjustment and positioning of the seal 150 by a user (such as by simply rolling or unrolling the seal 150) and greater comfort against the user's limb.

After placement of a limb, the seal 150 may be rolled in a proximal direction to surround a limb and seal the pressure chamber 110 from ambient pressure, as shown in FIG. 5. The seal 150 preferably has a length sufficient to contact a limb over a predetermined length to provide a strong pressure seal. In an embodiment of the pressure therapy device 100 the seal 150 may be interchangeable with different sizes to fit the anatomy of different users or limbs. The seal 150 may be provided with trimming indicia 158, such that the seal 150 may be cut to the dimensions of a user.

In an embodiment the inflatable padding 140 may provide additional support and protection to the limb by extending beyond the pressure chamber 110 in a proximal direction up to 20 mm.

As depicted in FIGS. 1-2 and 6, the pressure chamber 110 may comprise a support surface 130 at the second end 114. The support surface 130 may comprise a flat bottom portion 132 and angled portions 134 and may be molded as a separate part fixed to the pressure chamber 110. The flat bottom portion 132 allows the pressure chamber 110 to remain stable in a predetermined position such that a user may be seated comfortably during use of the pressure therapy device 100. The angled portions 134 may be present at the anterior and posterior surfaces 116, 118 such that the pressure chamber 110 can be stably positioned in a tilted position. The angled portions 134 may be curved, such that the pressure chamber 110 may be easily rotated, or may be flat to provide stability in a predetermined position.

Figure 25:
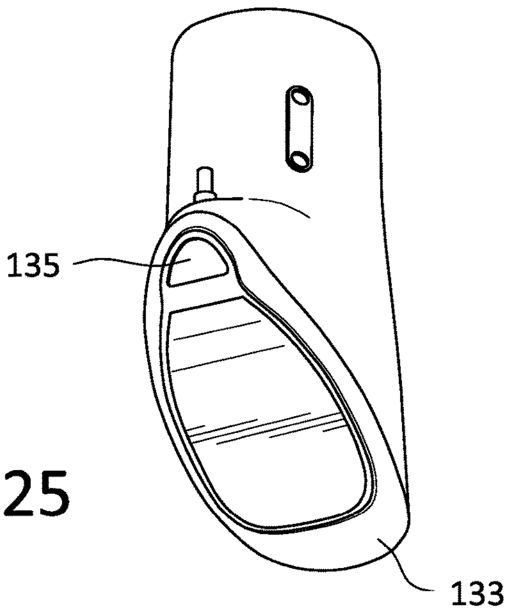
FIG. 25 is a bottom perspective view of a pressure chamber having different angled portions at a posterior and anterior side.

According to the embodiment of FIG. 25, a posterior angled portion 135 is flat while an anterior angled portion 133 is curved.

Figure 26:
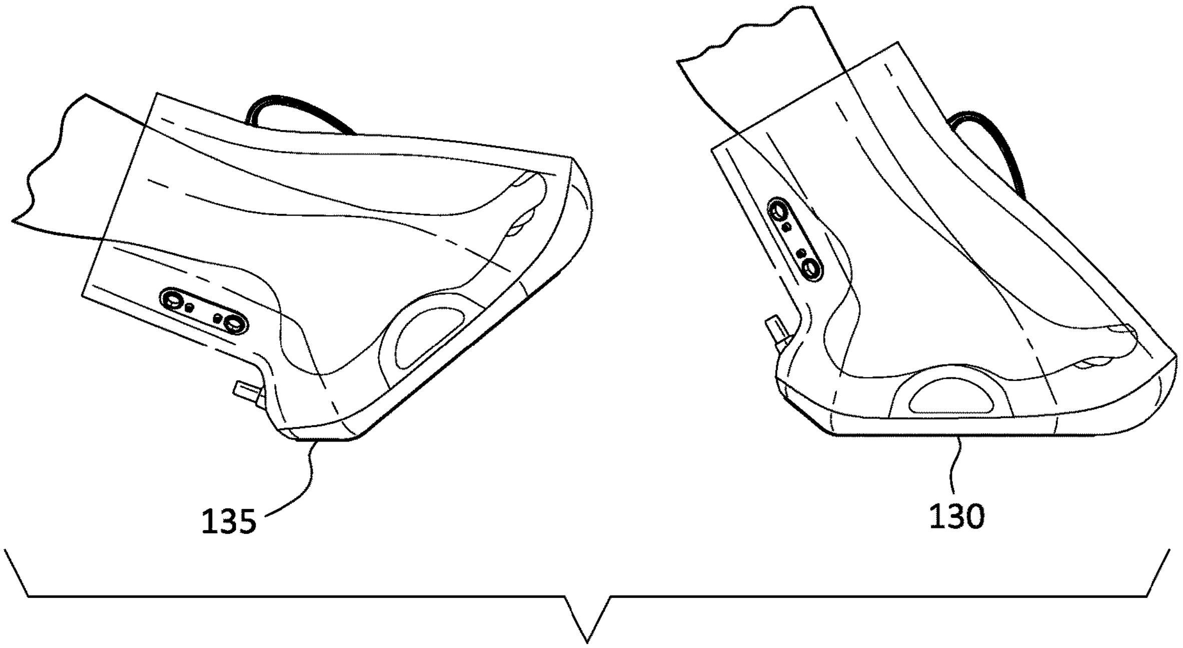
FIG. 26 is a side view of a pressure chamber moved from an upright position to lie on a lower surface by a limb of a user.

As shown in FIG. 26, the pressure chamber 110 may be positioned to rest on the posterior angled portion 135 in an upright position, where the angled portion may be used as a heel rest for stabilizing the pressure chamber in the upright position, such that a user may insert the limb into the pressure chamber without rotation or bending of the limb. The foot and the lower leg of the user may be inserted from a sitting position without rotating the ankle by only raising the leg and extending the knee. The limb may then contact the positioning mechanism 172 within the pressure chamber 110 and the pressure chamber 110 may rotate to lie on the flat portion of the lower surface 130.

The support surface 130 may comprise a modular space 180 for receiving one or more modular components. In one embodiment the modular components may be interchangeable and may include a vibration component, heating component, cooling component, etc.

Figure 4:
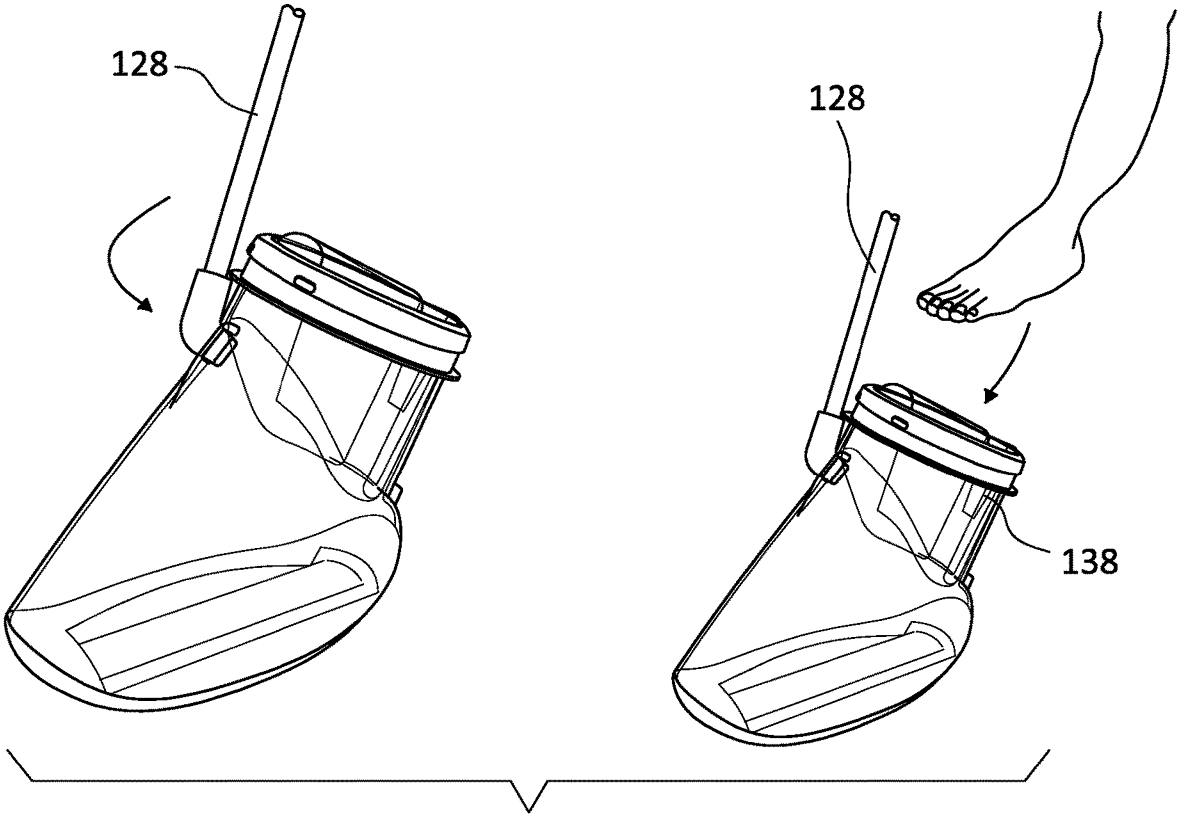
FIG. 4 shows a perspective view of a pressure therapy device configured with an adjustment piece and the method of donning and doffing.

As shown in FIG. 4, an adjustment piece 128 may engage the first locking element 126 to allow manipulation of the pressure chamber 110 from a distance, for example from a seated position. The pressure chamber 110 may then be lifted or rotated to allow passage of a limb through the opening 120 without requiring any bending or rotation of the limb.

A positioning mechanism 172 may indicate to a user the correct positioning of a limb within the pressure chamber 110, such that the limb rests comfortably without contacting walls or surfaces of the pressure chamber 110. Together with the rolled back seal 150, the adjustment piece 128, a third locking element and corresponding receiving element 138, the positioning mechanism 172 allows for easy and accurate placement of a limb within the pressure chamber 110.

Figure 28:
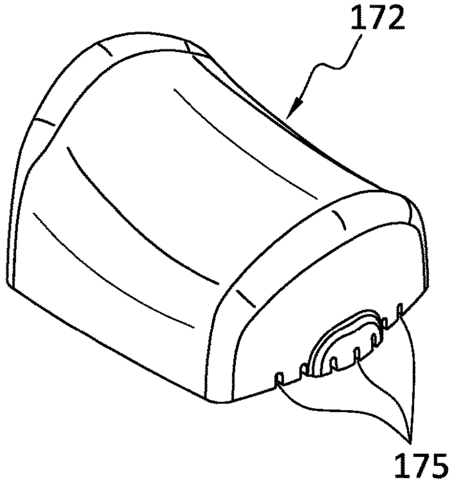
FIG. 28 is a perspective view of a positioning mechanism.

The positioning mechanism 172 is preferably positioned in the pressure chamber 110 such that contact is avoided with sensitive regions of the limb of a user. As shown in FIG. 28, the positioning mechanism 172 may be provided with receiving elements 175, such as grooves for locking to the bottom surface 130 of the pressure chamber. The bottom surface 130 of the pressure chamber 110 may have corresponding protrusions or locking elements. In one embodiment, the positioning mechanism 172 is provided with a plurality of receiving elements 175 corresponding to a plurality of protrusions on the bottom surface 130 of the pressure chamber, such that the positioning mechanism 172 may be adjustable and may be secured to the pressure chamber in many positions. The positioning mechanism 172 may be fixed to the bottom surface 130 of the pressure chamber 110.

In an embodiment, the positioning mechanism 172 may have a shape corresponding to the arch of a foot, as shown in FIGS. 17, 18 and 28, and may provide slight positive pressure massage to the foot which increases comfort and blood flow for a user. In one example, the medial and lateral sides of the positioning mechanism may have different heights and angles, for more comfortably securing the limb of the user in a preferred position. The positioning mechanism 172 may be provided with a hollow space, such as for adapting the flexibility of the positioning mechanism under the limb and/or for receiving a moisture removing element 174. The moisture removing element 174 may include a silica packet, for example.

In an embodiment, the positioning mechanism 172 may also provide a slight pressure during negative pressure cycles to force blood from the vascular bed under the foot up towards the heart. During oscillating pressure cycles, a slight massaging effect will be experienced under the foot.

The positioning mechanism 172 may be configured with a predetermined shape, such as a narrow arch having a predetermined height, designed to avoid pressure under the toes, front foot and heel where ulcers often are located. Any residual suction of the limb not compensated by the inflatable padding 140 would only cause the foot to flex upward (toes upward), while the heel would move slightly downward without touching the bottom of the pressure chamber 110.

To provide the described massaging effect without allowing the limb to contact the bottom of the pressure chamber 110, a positioning mechanism 170 may comprise a slightly elastic arch, such as having a height of 7 to 10 cm. The positioning mechanism may comprise a polyurethane or other slightly elastic material that is strong enough to prevent the limb of the user from collapsing the positioning mechanism and contacting the pressure chamber, while also slightly elastic to increase the massaging effect on the limb and provide a comfortable rest. The positioning mechanism may have a hardness of 30-50 shore A, more particularly 45 shore A.

Figure 16:
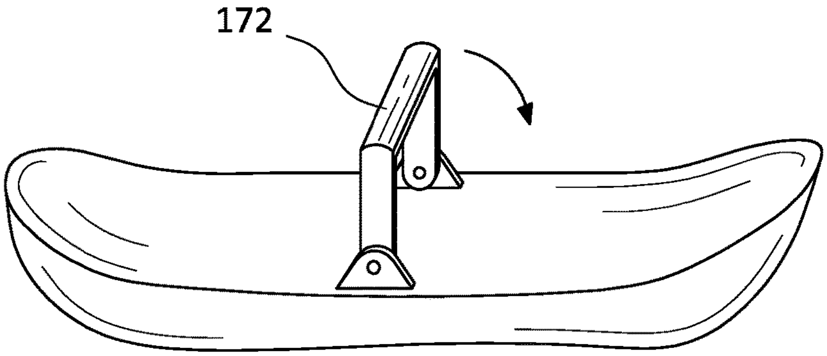
FIG. 16 shows a plan view of a positioning mechanism having a collapsible configuration.

The positioning mechanism 172 may be retractable, such that after contact with a limb the positioning mechanism 172 collapses or is withdrawn to ensure the limb is freely positioned within the chamber, as shown in FIG. 16. In another embodiment, the positioning mechanism 172 may be configured to provide support to the limb of a user throughout operation of the pressure therapy device 100.

Preferably, the limb may be positioned in the pressure chamber 110 without contacting the pressure chamber 110, as shown in FIG. 6. The wide opening 120 and short "neck" or receiving region 122 combine to facilitate entry of the limb, such that the pressure chamber 110 may be manipulated to "thread" onto the limb of the user by advantageous use of the adjustment piece 128 and the angled portion 134 of the support surface until the limb contacts the positioning mechanism 172. Positioning a limb in this way enables the user to position the limb without requiring significant exertion or difficulty, and ensures a greater portion of the limb is exposed to pressure therapy while preventing pressure points or skin damage.

In one example according to FIG. 4, the pressure chamber 110 may be configured to have a shape similar to a boot for receiving a foot. In contrast to a regular boot the pressure chamber 110 has streamlined features, including a wide opening, a short neck, and a sloped anterior portion. The pressure chamber 110 can be advantageously threaded over the foot of a user without flexion or rotation of an ankle or other joint, which may be difficult or painful for a user.

The pressure chamber 110 may be configured to be assembled or closed about a limb. While a pressure chamber 110 configured to be assembled or closed about a limb provides the same advantage of limited flexion or rotation of a limb, the implementation is more difficult and manufacturing and sealing the pressure chamber 110 are more complex. It is preferred to use a pressure chamber 110 having the preferred wide opening 120 and short receiving region 122 for insertion of a limb.

A stabilizing structure 170 may extend from the pressure chamber 110 to position the pressure chamber 110 and support the limb in a particular position, for example a resting position. The stabilizing structure 170 may support the limb of a user in a reclined position, to provide comfort during use or may assist the user in initial positioning of the limb within the pressure chamber 110. Preferably, the stabilizing structure 170 is adjustable to different lengths and positions.

Figure 10:
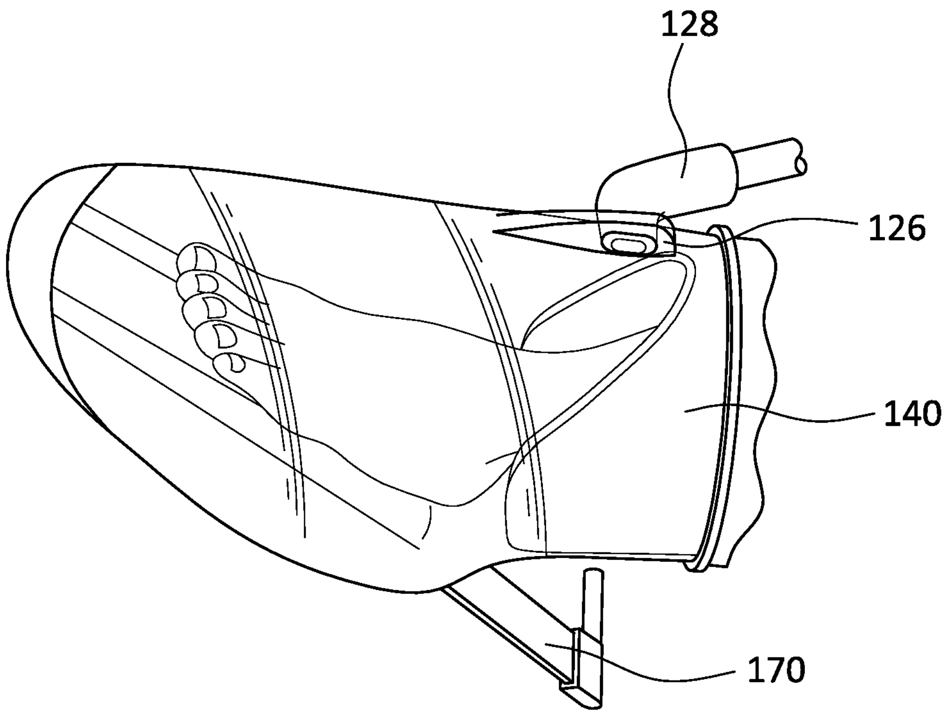
FIG. 10 is a perspective view of an image of a pressure therapy device with a stabilizing structure.

While shown in FIGS. 6 and 10 as a single straight piece, the stabilizing structure 170 may be curved, may include multiple pieces, may be split in a fish tail configuration and may be retractable within or separable from the pressure chamber 110. In an embodiment the stabilizing structure 170 may comprise a least one elastic bow extending from the pressure chamber 110, and may further be adjustable to different positions or curvature. The stabilizing structure 170 facilitates use and positioning of the pressure therapy device 100 by a user, and assists in avoiding pressure points or discomfort by helping the pressure therapy device 100 to be properly supported.

Figure 24:
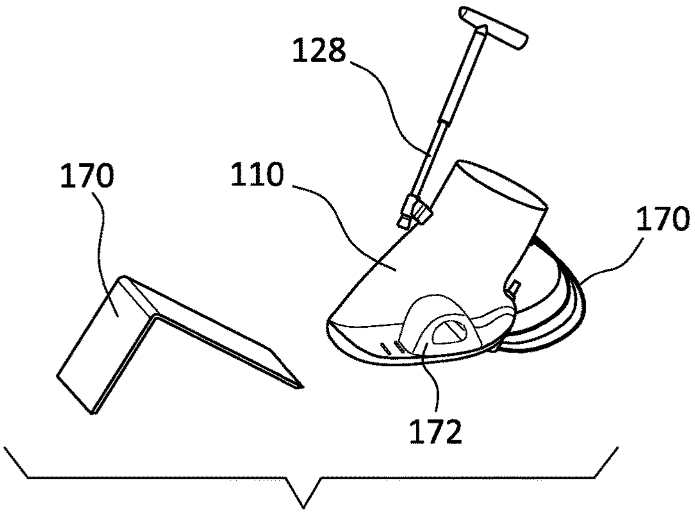
FIG. 24 is a perspective view of a pressure chamber system including a plurality of components.

As shown in FIG. 24, the pressure chamber 110 may be provided with a stabilizing structure 170, positioning mechanism 172 and adjustment piece 128.

As shown in FIG. 1, the pressure chamber 110 is configured such that the anterior and posterior 116, 118 sides of the pressure chamber 110 extend at a predetermined angle for providing a wide opening 120. The anterior side 116 of the pressure chamber 110 may be configured to be predominantly straight, to facilitate the passage of a limb through the opening 120 and the receiving space without bending or rotating a limb. In certain embodiments, the posterior side 118 of the pressure chamber 110 may be extended beyond the extension of the anterior side 116.

The pressure region of the pressure chamber 110 may communicate with a pump unit 190 with a conduit 188 at a posterior side 118 of the pressure chamber. Embodiments of the device are not limited to a particular location for the conduit 188, as long as the conduit is in communication with the pressure region 124.

Figure 7:
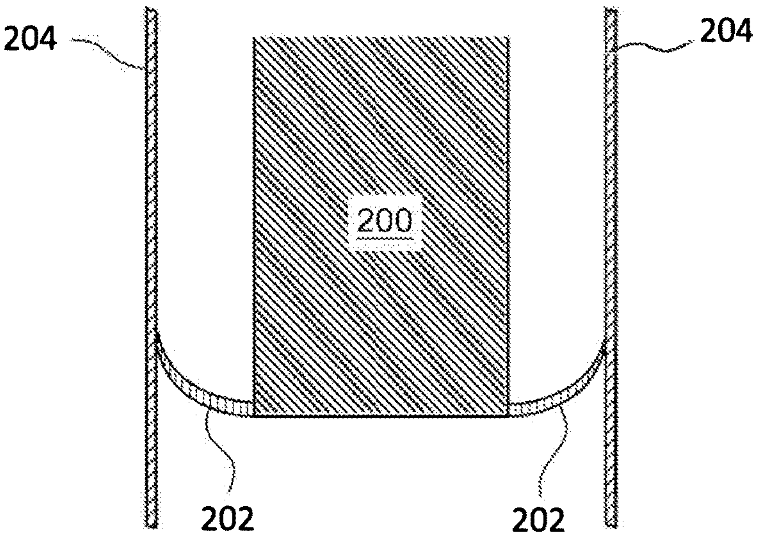
FIG. 7 is a plan view of a piston of a pump unit according to an embodiment.

As shown in FIGS. 7 and 19, the piston 200 of the pump unit 190 may include wings 202 for contacting a cylinder 204. As the piston 200 is moved within the cylinder 204, non-atmospheric pressure is generated within the pressure chamber 110. The wings 202 reduce the friction between the piston 200 and the cylinder 204, such that the resistance of the cylinder 204 to the movement of the piston 200 is reduced, thereby reducing the mechanical requirement for moving the piston 200 to generate non-atmospheric pressure.

Because the piston 200 is not in direct contact with the cylinder 204, engineering tolerance is increased and the piston 200 and/or the cylinder may be manufactured by injection molding, which requires a slightly conical shape to allow removal of the molded part from a mold, rather than as a "perfect" cylinder shape. Sides of the molded part may have an inclination angle of 0.2 degrees, forming a slightly conical shape.

Prior art methods for creating a piston 200 without the described wings 202 typically require more precise components and more expensive materials, such as metals. The use of the injected molded parts according to the current disclosure allow the piston 200 and/or the cylinder 204 to be each produced as a single injection molded part, resulting in a reduction in the cost of materials and the required precision in manufacturing. This is particularly advantageous because of the cost of producing components that require precise conformity; by using wings 202, the tolerance for components of different sizes is increased, which simplifies the costs and complications of the manufacturing process, reducing the cost of the piston 200 and cylinder 204.

In an embodiment the wings 202 may comprise an elastic material to adjust to the dimensions of the piston 200 and cylinder 204. Using elastic wings 202 allows the piston 200 to adjust to varying dimensions of the cylinder 204. The adjustable nature of the piston 200 and elastic wings 202 allows for manufacturing low cost cylinders 204, particularly molded cylinders where a first end of the cylinder may have a diameter that is larger than a second end. In one embodiment, the first end of the cylinder 204 may form an angle of up to three degrees with the second end. The elastic wings 202 are configured to have a length and elasticity sufficient to seal the cylinder 204 along its entire length.

Figure 8:
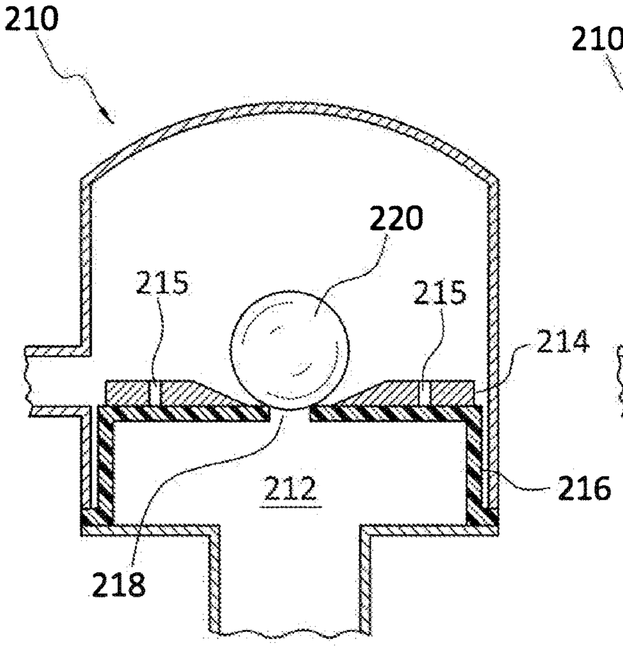
FIG. 8 is a plan view of a first valve system of a pump unit.

Referring to FIG. 8, a first valve system 210 is depicted for opening and closing communication between the pressure region 124 and ambient atmospheric pressure. The first valve system 210 may include an enclosed passage 212 that communicates with the pressure region 124 and ambient atmospheric pressure. As depicted, the passage 212 may include an elastic covering 216 on an ambient atmospheric pressure side and a chamfered washer 214 on a pressure region side, the elastic covering 216 and the chamfered washer 214 together defining a central opening 218 wider at the chamfered washer 214 than at the elastic covering 216. A sealing unit 220 is placed within the passage 212 on the pressure region side of the chamfered washer 214.

According to an embodiment, the sealing unit 220 may include a ball having dimensions configured to close the central opening 218 by contact with the chamfered washer 214 and the elastic covering 216. Because the elastic covering 216 contacts the sealing unit 220, the engineering tolerance for the sealing unit 220 is increased and the sealing of the central opening 218 is improved.

When generating a negative pressure within the pressure region 124, the sealing unit 220 keeps central opening 218 closed until a predetermined pressure is reached that lifts the sealing unit 220 from the central opening 218 and allows communication between the pressure region 124 and ambient atmospheric pressure. The pressure region 124 may be configured with a maximum safe pressure by adjustment of the mass of the sealing unit 220, elasticity of the elastic covering 216, and the dimensions of the central opening 218. In a preferred embodiment the sealing unit 220 is removed from the central opening 218 at a pressure of 60 to 150 mmHg, more particularly 60 to 75 mmHg.

The chamfered washer 214 may include additional openings 215 positioned at the sides of the chamfered washer 214 to open the elastic covering 216 in response to an overpressure. The first valve system 210 operates as a safety valve.

The elastic covering 216 may be pre-stretched and fixed in the passage 212 by means of the chamfered washer 214 and the walls of the passage 212. As depicted in FIG. 8, the elastic covering 216 is fixed in place and cannot move or be pulled through the central opening 218 in response to a negative pressure.

Figure 9:
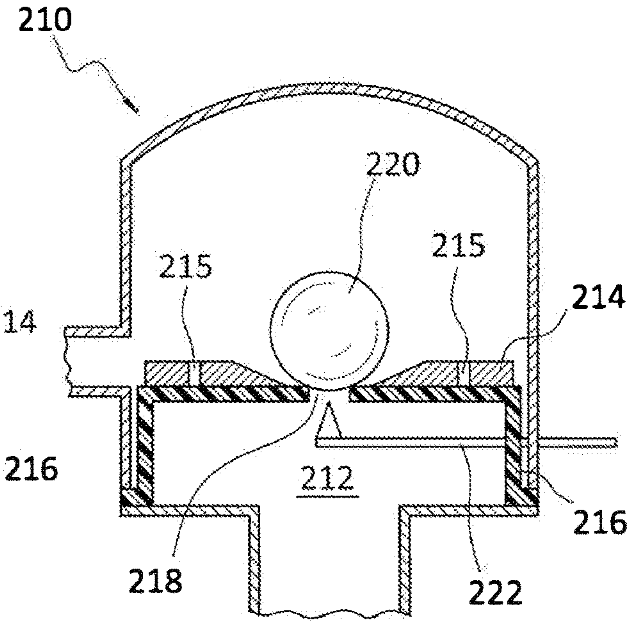
FIG. 9 is a plan view of a first valve system of a pump unit having a leverage arm.

As shown in FIG. 9, the first valve system 210 may include a leverage arm 222 configured to displace the sealing unit 220 at a predetermined time or in response to a predetermined pressure. When the leverage arm 222 displaces the sealing unit 220 the pressure chamber 110 is in communication with ambient pressure, and the interior pressure of the pressure chamber may adjust to ambient pressure.

A preferred method of use for the pressure therapy device 100 is for pressure therapy to the limb of a user. Pressure therapy may include the application of a pulsating pressure or repeated, alternating introduction of two or more different pressures during consecutive time periods. In one example, a pulsating pressure can comprise the alternating introduction of an applied pressure and release of the applied pressure to return to approximately atmospheric pressure. The applied pressure can be a positive pressure or a negative pressure. In embodiments using a negative pressure, the period during which the negative pressure is introduced and is present is the negative pressure period. Likewise, in systems utilizing a positive pressure, the period during which the positive pressure is introduced and is present is the positive pressure period. In each case, the period during which the applied pressure is released, and atmospheric pressure is returned and is present is the atmospheric pressure period.

Embodiments discussed herein are discussed referring to a negative applied pressure. Usually negative pressure systems can be readily substituted with positive pressure systems by inverting pump and valve operations or by other adjustments apparent to one of ordinary skill in the art. One should appreciate that any discussion of negative pressure systems, unless otherwise indicated, likewise applies to positive pressure systems. In such case, the term "negative pressure" as used herein should be interchanged with the term "positive pressure" and pressure values should likewise be substituted. The disclosure should not be construed to exclude devices and methods using a positive pressure rather than a negative pressure.

In some embodiments, multiple, consecutive, alternating negative pressure periods and atmospheric pressure periods are applied to a limb within a pressure chamber without removing the limb from the chamber. The negative and atmospheric pressure periods can be of the same or a different duration. In some embodiments, the negative pressure periods and atmospheric pressure periods can be selected according to known methods, such as those described in commonly owned U.S. Patent Application Publication No. 2005/0027218, published Feb. 3, 2005, which is herein incorporated by reference.

In some embodiments the negative pressure period is between 1 second and 20 seconds in duration and the atmospheric pressure period is between 2 seconds and 15 seconds in duration. Further, in some embodiments, the negative pressure period is between 5 seconds and 15 seconds in duration and the atmospheric pressure period is between 5 seconds and 10 seconds in duration. And in some preferred embodiments, the negative pressure period is approximately 10 seconds in duration and the atmospheric pressure period is approximately 7 seconds in duration.

The pressure applied within the pressure chamber can be fixed or selected at the point of use. Embodiments of devices and methods according to the present disclosure provide for applying a negative pressure of −150 mmHg or less, more particularly −80 mmHg (−10.7 kPa) or less. Corresponding pressure chambers are configured to withstand negative pressures of at least −80 mmHg (−10.7 kPa), and preferably considerably more. In some embodiments, the negative pressure can be −60 mmHg (−8.0 kPa) or less. Some embodiments utilize a negative pressure of approximately −40 mmHg (−5.3 kPa). The preferred negative pressures have been selected to reduce complications that might arise from applying higher negative pressures. In some embodiments, a negative pressure has been selected to encourage local vasodilation in the surface of the limb while minimizing the risk of possible complications. Pulsating the negative pressure has been found to encourage blood flow and a pulsating negative pressure of 0 to −40 mmHg (0 to −5.3 kPa) is preferably generated in the pressure chamber.

Figure 20:
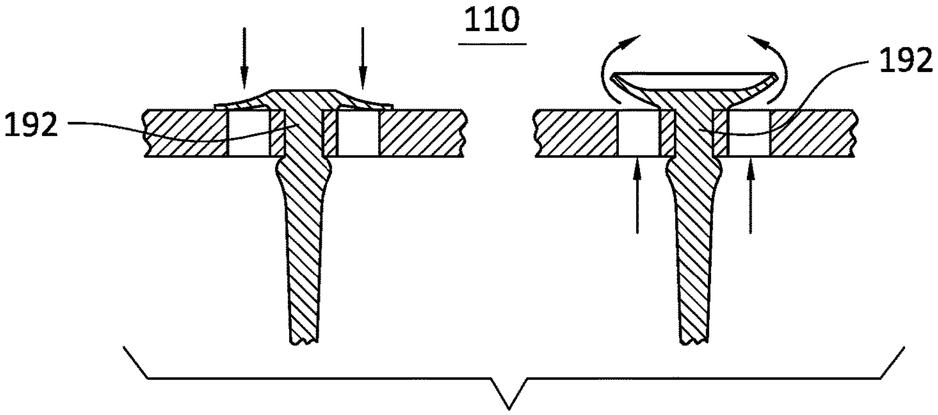
FIG. 20 shows a side-by-side plan view of a valve in an open and closed configuration.

According to an embodiment of the device in FIGS. 20 and 27, the inflatable padding 140 is configured with a valve 192 to provide communication with ambient atmospheric pressure, preferably a one-way valve or a check valve. The valve 192 may be positioned to extend through a side of the pressure chamber 110 in fixation nobs 242 surrounding openings in the inflatable seal and extending through openings in the pressure chamber 110.

In such an embodiment the inflatable padding 140 is inflated by applying negative pressure within the pressure chamber 110, and does not require the use of any additional vacuum or pressure generating mechanism. Advantageously, when the inflatable padding 140 is provided with a valve 192, the inflatable padding 140 will inflate in response to the negative pressure and fix the limb in a predetermined position within the pressure chamber 110. Where the inflatable padding 140 is provided with multiple chambers, each chamber is provided with a valve or a three-way valve is provided for independent inflation and deflation.

The leverage arm 222 may be positioned to displace the sealing unit 220 during the atmospheric pressure period and to retract during the negative pressure period. According to an embodiment of the pressure therapy device 100 the leverage arm 222 may be secured to a motor of the pump unit 190, such that the torque of the motor moves the leverage arm 222 away from the central opening 218 when the motor is activated for driving the piston 200 and generating a non-atmospheric pressure, and displaces the sealing unit 220 only when the motor is not in use.

At the conclusion of a negative pressure period and during an atmospheric pressure period within the pressure chamber 110, the inflatable padding 140 may provide an overpressure against the limb of the user. The overpressure results from the changing pressure within the pressure chamber 110 that the inflatable padding 140 cannot adjust to due to the closure of the valve 192. The overpressure against the limb of a user may cause the application of positive pressure against the limb of a user of about 10 mmHg during the atmospheric pressure period, further increasing blood flow through the limb of the user by direct mechanical force.

The inflatable padding 140 may be configured with material of a greater or lesser thickness to adjust and control the magnitude of overpressure applied to the limb. The inflatable padding 140 may have a variable thickness, to distribute pressure or overpressure unevenly to the limb. A higher thickness area may be arranged to contact areas needing less pressure or compression, whereas a thinner thickness area may be arranged to contact areas needing more pressure. The thicknesses may also be arranged based on needed heat transfer characteristics or comfort needs.

When in use, the inflatable padding 140 is inflated during a negative pressure period and secures the limb of the user within the pressure chamber 110. To make it possible for the user to remove the limb after use, the inflatable padding 140 is adapted to be deflated to release the pressure created during the negative pressure periods of the pressure therapy device 100.

Figure 21:
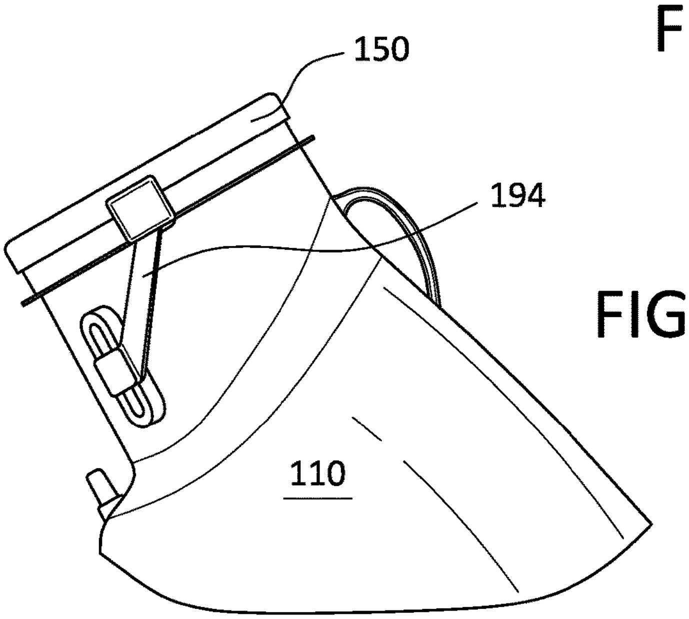
FIG. 21 shows a side perspective view of a pressure chamber having a lever actuated valve mechanism.
Figure 22:
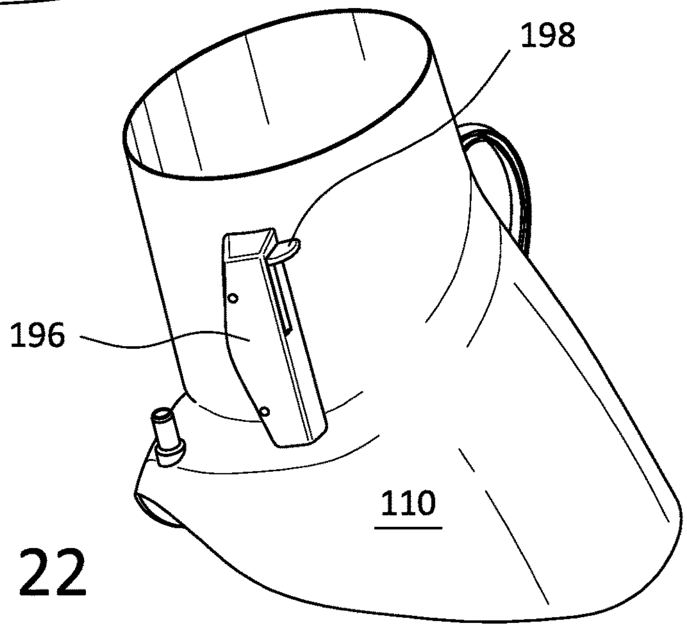
FIG. 22 shows a side perspective view of a pressure chamber having a timer valve mechanism.

To deflate the inflatable padding 140, and enlarge the opening 120 of the pressure chamber 110 for insertion or removal of the limb of a user, the valve 192 may comprise a lever actuated valve 194, a timer valve 196, or a manually actuated valve (not shown). According to FIG. 21, the lever actuated valve 194 may be provided on the exterior of the pressure chamber 110 such that the seal 150 in a rolled back position actuates the lever and opens the valve 192. When the seal 150 is rolled onto the limb of a user, the valve 192 resumes a closed position, and can be inflated in response to the negative pressure. According to FIG. 22, a timer valve 196 may be provided on the exterior of the pressure chamber 110, such that a user may actuate the valve by depressing a switch 198.

Figure 23:
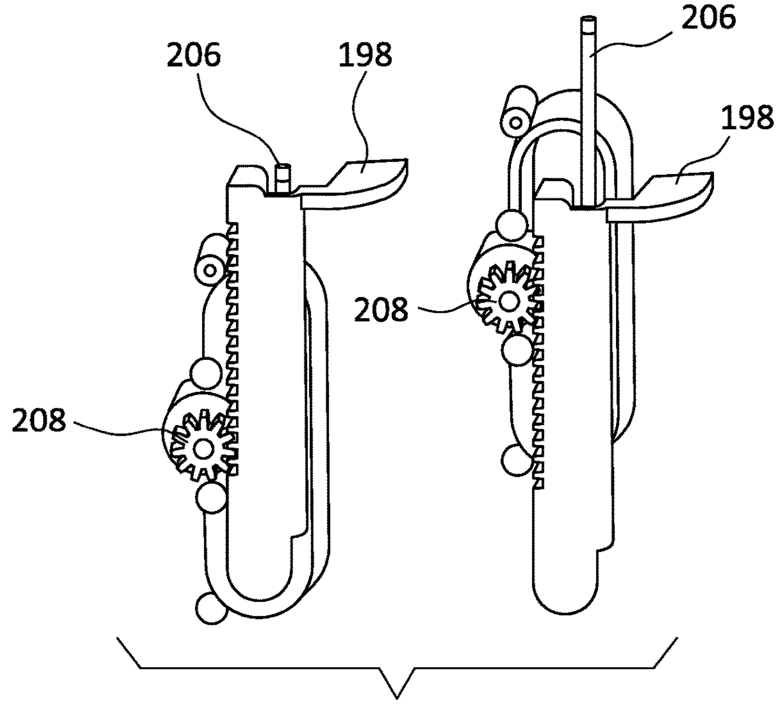
FIG. 23 is a side-by-side detail view of a timer valve mechanism including a spring and rotational damper in an actuated state.

As shown in FIG. 23, the switch 198 actuates the valve 192 in a depressed position but is connected to a spring 206 and a rotational damper 208, such that the switch 198 slowly returns to its original position and closes the valve 192. The spring 206 and the rotational damper 208 can be configured to actuate the valve 192 for a predetermined amount of time, such that the predetermined amount of time will deflate the inflatable padding 140 and remove the limb of a user. In a manually actuated valve, a button may be provided that the user may depress to actuate the valve 192. The valve remains open only for the period that the user depresses the button. In embodiments having for example the three-way valve, the valve 192 may also be connected to the pump unit 190 for deflating the inflatable padding 140 in a rapid manner.

By providing a medical pressure therapy device according to the embodiments of the disclosure, the problems of pressure therapy devices being difficult to customize for individual users, limited in pressure therapy techniques, difficult to don for users of limited dexterity or strength, uncomfortable due to pressure points and contact between the pressure chamber and wounds or sores on the limb of a user, and dangerous due to the buildup of unhealthy levels or durations of non-atmospheric pressure are addressed. The pressure therapy device of the disclosure advantageously allows for a user to intuitively and accurately don the device without the aid of a clinician. The device, thanks to the operation of the seal and the inflatable pads, conforms to the user's dimensions and prevents the device from contacting wounds on the surface of the user's limb. The device further has unique valve arrangements that automatically mitigate harmful levels or durations of pressure, while providing an advantageous distribution of negative pressure about the limb and an intermittent massaging effect.

Case studies have been employed to demonstrate the efficacy of the pressure therapy device according to the current disclosure and have yielded positive initial outcomes.

In one such study, the effect of varying pressure levels on the limb of the user was analyzed by employing the pressure therapy device of the current disclosure to treat a sample population of 16 individuals suffering from peripheral arterial disease. Over 90 percent of the sample population in the study suffered from mild claudication and were categorized as stage II of the fontaine stages for chronic limb ischemia.

Pairwise comparisons of the impact of pressure levels −10 mmHg, −20 mmHg, −40 mmHg and −60 mmHg on flow and laser Doppler flux measurements of the leg and foot were performed, and demonstrated a statistically significant increase in flow and Doppler flux, as shown in Table I below.

TABLE I

| | Flow | | | | | Laser Doppler Flux | | | | |
|---|---|---|---|---|---|---|---|---|---|---|
| Sample 1 vs Sample 2* | Test Statistic | Std. Error | Std. Test Statistic | p-value | Adjusted p-value # | Test Statistic | Std. Error | Std. Test Statistic | p-value | Adjusted p-value # |
| 0 vs −10 mmHg | −0.38 | 0.56 | −0.67 | 0.50 | 1.00 | −0.56 | 0.56 | −1.01 | 0.31 | 1.00 |
| 0 vs −20 mmHg | −1.31 | 0.56 | −2.35 | 0.02 | 0.19 | −1.06 | 0.56 | −1.90 | 0.06 | 0.57 |
| 0 vs −40 mmHg | −2.56 | 0.56 | −4.58 | <0.01 | <0.01 | −2.25 | 0.56 | −4.03 | <0.01 | <0.01 |
| 0 vs −60 mmHg | −3.25 | 0.56 | −5.81 | <0.01 | <0.01 | −2.38 | 0.56 | −4.25 | <0.01 | <0.01 |
| −10 mmHg vs −20 mmHg | −0.94 | 0.56 | −1.67 | 0.09 | 0.94 | −0.50 | 0.56 | −0.89 | 0.37 | 1.00 |
| −10 mmHg vs −40 mmHg | −2.19 | 0.56 | −3.91 | <0.01 | <0.01 | −1.69 | 0.56 | −3.02 | <0.01 | 0.03 |
| −10 mmHg vs −60 mmHg | −2.88 | 0.56 | −5.14 | <0.01 | <0.01 | −1.81 | 0.56 | −3.24 | 0.01 | 0.01 |
| −20 mmHg vs −40 mmHg | −1.25 | 0.56 | −2.24 | 0.03 | 0.25 | −1.19 | 0.56 | −2.12 | 0.03 | 0.34 |
| −20 mmHg vs −60 mmHg | −1.94 | 0.56 | −3.47 | <0.01 | <0.01 | −1.31 | 0.56 | −2.35 | 0.02 | 0.19 |
| −40 mmHg vs −60 mmHg | −0.69 | 0.56 | −1.23 | 0.22 | 1.00 | −0.13 | 0.56 | −0.22 | 0.82 | 1.00 |

As demonstrated, embodiments of the pressure therapy device utilizing a negative pressure of approximately −40 mmHg (−5.3 kPa) shows a significant improvement in blood flow through the limb of patients suffering from peripheral arterial disease, and can thereby improve healing.

An additional study has reviewed the effect of the pressure therapy device of the current disclosure on individuals suffering from critical lower limb ischaemia. These individuals suffer numerous symptoms, including chronic pain and open wounds or ulcers on the lower limbs. In particular, individuals who were not suitable for or who had elected not to undergo a revascularization procedure, i.e. angioplasty, vascular bypass or other surgical intervention, were selected for treatment.

Initial data from the study show that chronic wounds tend to deteriorate when no revascularisation options are available with 5/7 of the original wounds in the standard care group increasing in size by an average of 275% (SD 514%) and two new wounds developing. When the pressure therapy device of the current disclosure was used, wound healing was observed in 6/9 wounds present at the start of treatment, with an average decrease in wound size of 19% (SD 78%).

Alongside changes in wound size, changes in the care and management of the wounds were also seen. The number times of dressing were changed per week to manage the wounds in the control group increased from 1.67 to 3.67 on average, while a reduction from 2.75 to 1.75 times per week was observed in the group treated with the pressure therapy device of the current disclosure. As each wound dressing requires both a physical cost per dressing and a specialist vascular nurse or podiatrist to assist this indicates a potential cost saving advantage for the pressure therapy device of the current disclosure over prior art methods.

Foot pain was recorded for participants on a Visual Analogue Scale in which 0 represents no pain and 100 represents the worst pain imaginable. Foot pain increased slightly in the control group from 46 to 58 but was shown to decrease in the group treated with the pressure therapy device of the current disclosure from 48.75 to 45.25. Pain management with medication was also shown to differ between the two groups with a reduction of opioid pain medication in the treatment group versus the control group.

The case studies above clearly demonstrate the advantages of treatment using the pressure therapy device of the current disclosure, including increased wound healing, reduction in treatment costs, decrease in pain, and a decrease in the need for opioid use. No similar advantages appear to have been accomplished in the prior art.

As is readily apparent from the foregoing discussion, it is understood that the size, number, configuration and location of the medical pressure therapy device and the components thereof can be adjusted so many different users having different sized joints and body parts may benefit from the present design with no custom manufacturing and design. It is also understood that the arrangement of the inflatable pads, seals, positioning mechanisms, and other components can be alternated from those shown, as advantageous for users of different dimensions and pathologies.

It is to be understood that not necessarily all objects or advantages may be achieved under any embodiment of the disclosure. Those skilled in the art will recognize that the embodiments may be embodied or carried out in a manner that achieves or optimizes one advantage or group of advantages as taught herein without necessarily achieving other objects or advantages as taught or suggested herein.

The skilled artisan will recognize the interchangeability of various disclosed features. Besides the variations described herein, other known equivalents for each feature can be mixed and matched by one of ordinary skill in this art to construct an orthopedic device under principles of the present disclosure.

Although the medical pressure therapy device is disclosed in certain exemplary embodiments and examples, it therefore will be understood by those skilled in the art that the present disclosure extends beyond the specifically disclosed embodiments to other alternative embodiments and/or uses of the pressure therapy device and obvious modifications and equivalents thereof. It is intended that the present medical pressure therapy device herein disclosed should not be limited by the disclosed embodiments described above.

The invention claimed is:

1. A pressure therapy device, comprising:

a pressure chamber having a first end and a second end, the first end comprising an upper edge defining an opening;

an inflatable padding positioned in the opening and extending from an interior region of the pressure chamber through the opening, a proximal portion of the inflatable padding projecting beyond the upper edge of the pressure chamber in a proximal direction; and a seal secured to the first end of the pressure chamber and arranged to enclose the inflatable padding and the interior region of the pressure chamber from ambient pressure when sealing against a limb of a user;

wherein the inflatable padding is configured to be inflatable to narrow the opening and to separate the limb from contact with the pressure chamber;

wherein the inflatable padding defines a distal termination in the interior region of the pressure chamber and a proximal termination opposite the distal termination, a posterior portion of the distal termination of the inflatable padding defining a first plane and an anterior portion of the distal termination of the inflatable padding defining a second plane oblique to the first plane.

2. The pressure therapy device of claim 1, wherein the inflatable padding includes at least two air chambers.

3. The pressure therapy device of claim 2, wherein each of the at least two air chambers comprises a cylinder having a closed distal end and a closed proximal end.

4. The pressure therapy device of claim 1, wherein the proximal portion of the inflatable padding projects beyond the upper edge of the pressure chamber in a proximal direction at a distance of 5 to 20 mm.

5. The pressure therapy device of claim 1, wherein a length of the inflatable padding from the distal termination to the proximal termination varies along a circumference of the opening of the pressure chamber.

6. The pressure therapy device of claim 5, wherein a posterior length of the inflatable padding from the distal termination to the proximal termination is greater than an anterior length of the inflatable padding from the distal termination to the proximal termination.

7. The pressure therapy device of claim 5, wherein the length of the inflatable padding from the distal termination to the proximal termination continuously decreases from a posterior side of the inflatable padding to an anterior side of the inflatable padding.

8. The pressure therapy device of claim 1, wherein the inflatable padding defines an interior volume sealed from the pressure chamber, such that a pressure within the interior volume may differ from a pressure within the interior volume of the pressure chamber.

9. The pressure therapy device of claim 1, wherein the inflatable padding includes a valve in communication with ambient pressure.

10. The pressure therapy device of claim 1, wherein the seal comprises a frustoconical cuff defining a distal end and a proximal end, the proximal end defining a center axis eccentric to a center axis of the distal end in a posterior direction.

11. The pressure therapy device of claim 10, wherein the seal further comprises a protrusion extending from an exterior surface of the frustoconical cuff.

12. The pressure therapy device of claim 1, comprising an elastic support in the interior region of the pressure chamber opposite the inflatable padding, the elastic support defining an arcuate shape.

13. The pressure therapy device of claim 12, wherein the elastic support is hollow.

14. A method of using a pressure therapy device, the method comprising:

obtaining a pressure chamber having a first end and a second end, the first end comprising an upper edge defining an opening;

providing an inflatable padding in the opening of the pressure chamber, the inflatable padding positioned in the opening and extending from an interior region of the pressure chamber through the opening, a proximal portion of the inflatable padding projecting beyond the upper edge of the pressure chamber in a proximal direction;

inserting a limb into the pressure chamber through the inflatable padding and the opening of the pressure chamber;

providing a seal for sealing against the limb and enclosing the inflatable padding and the interior region of the pressure chamber from ambient pressure; and generating a negative pressure in the pressure chamber;

wherein the inflatable padding prevents the limb from contacting the pressure chamber without sealing the interior region of the pressure chamber.

15. The method according to claim 14, wherein the method further comprises:

releasing the negative pressure in the pressure chamber; and generating an overpressure in the inflatable padding for massaging the limb.

16. The method according to claim 15, wherein the inflatable padding defines an interior volume sealed from the pressure chamber, such that a pressure within the interior volume differs from a pressure within the interior of the pressure chamber during the generation of an overpressure in the inflatable padding.

17. The method according to claim 14, wherein during use of the pressure therapy device the limb only contacts the inflatable padding and the seal of the pressure therapy device.

18. The method according to claim 17, wherein the limb is suspended in the pressure chamber by the inflated inflatable padding.

19. The method according to claim 14, wherein the method further comprises:

inflating the inflatable padding about the limb before or during the generation of the negative pressure in the pressure chamber;

wherein the inflated inflatable padding secures the limb in the opening of the pressure chamber relative to the pressure chamber.

20. The method according to claim 14, wherein the method further comprises:

contacting an elastic support within the pressure chamber with the limb during insertion of the limb into the pressure chamber; and inflating the inflatable padding about the limb before or during the generation of the negative pressure in the pressure chamber;

wherein the inflated inflatable padding and the elastic support secure a position of the limb in the opening of the pressure chamber relative to the pressure chamber.

* * * * *